US012757996B2

(12) United States Patent
Hoang et al.

(10) Patent No.: US 12,757,996 B2
(45) Date of Patent: Oct. 13, 2026

(54) METHOD FOR OBTAINING AND STORING INFORMATION SUITABLE FOR PRODUCTION OF ARTIFICIAL NAILS FOR AN INDIVIDUAL

(71) Applicant: Kim Phuc Hoang, Hanoi (VN)

(72) Inventors: Kim Phuc Hoang, Hanoi (VN); Ngoc Diep Nguyen, Hanoi (VN); Duong Thanh Hoang, Hanoi (VN)

(73) Assignee: Kim Phuc Hoang, Hanoi (VN)

( * ) Notice: Subject to any disclaimer, the term of this patent is extended or adjusted under 35 U.S.C. 154(b) by 1066 days.

(21) Appl. No.: 17/638,225

(22) PCT Filed: Aug. 14, 2020

(86) PCT No.: PCT/VN2020/000007
§ 371 (c)(1),
(2) Date: Feb. 25, 2022

(87) PCT Pub. No.: WO2021/051142
PCT Pub. Date: Mar. 18, 2021

(65) Prior Publication Data
US 2022/0295965 A1 Sep. 22, 2022

(30) Foreign Application Priority Data
Sep. 14, 2019 (GB) ...................................... 1913301

(51) Int. Cl.
*G06T 7/50* (2017.01)
*A45D 31/00* (2006.01)
*G06T 7/60* (2017.01)

(52) U.S. Cl.
CPC ................ *A45D 31/00* (2013.01); *G06T 7/50* (2017.01); *G06T 7/60* (2013.01)

(58) Field of Classification Search
CPC .............. A45D 31/00; G06T 7/50; G06T 7/60
See application file for complete search history.

(56) References Cited

U.S. PATENT DOCUMENTS 12,011,075 B2 * 6/2024 Giron ..................... B33Y 50/00
12,161,211 B2 * 12/2024 Cochran .............. B29C 64/386
(Continued)

FOREIGN PATENT DOCUMENTS

WO 2005077132 A2 8/2005
WO 2016067704 A1 5/2016

*Primary Examiner* — Bobbak Safaipour
(74) *Attorney, Agent, or Firm* — Jose Cherson Weissbrot

(57) ABSTRACT

The present invention relates to a method for obtaining and storing information suitable for production of artificial (also referred to as "fake") nails for an individual. In particular, there is provided a method for obtaining and storing information suitable for production of artificial nails for an individual, the method comprising the steps of:

a) Providing a first untrimmed artificial nail of length, L, width, W, and depth of curvature, D,
b) Trimming the artificial nail to fit an individual's nail,
c) Recording information characterising the shape of the trimmed artificial nail, which includes at least information defining the boundary line of the trimmed artificial nail, and which information is sufficient to allow reproduction of the trimmed artificial nail from an untrimmed artificial nail, and
d) Storing the information as well as identifying details of the individual.

In the fitting of artificial nails the first priority of the customer is a high-quality look of the artificial nail. This requires an accurate fitting of the artificial nails, which is time-consuming for both the customer and the nail technician.

The present invention enables the production of artificial nails for an individual with high quality fit in a reduced appointment time based on stored information on the individual and previous artificial nail fittings.

14 Claims, 15 Drawing Sheets

(56) References Cited

U.S. PATENT DOCUMENTS

| | | | | |
|---|---|---|---|---|
| 2004/0143359 | A1 * | 7/2004 | Yogo | A45D 31/00<br>700/161 |
| 2021/0030133 | A1 * | 2/2021 | Song | A45D 31/00 |

* cited by examiner

FIG. 5

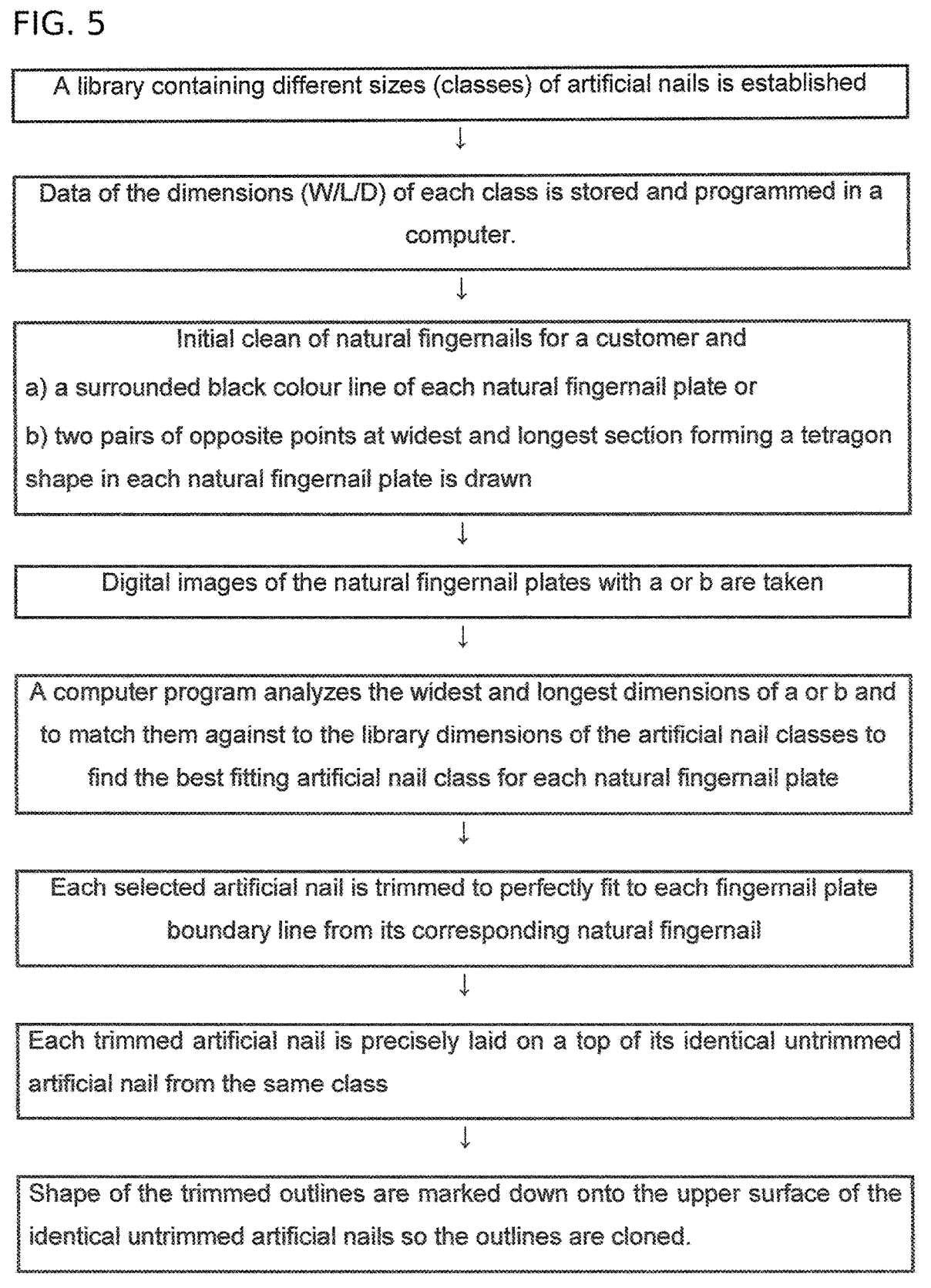

A library containing different sizes (classes) of artificial nails is established

↓

Data of the dimensions (W/L/D) of each class is stored and programmed in a computer.

↓

Initial clean of natural fingernails for a customer and a) a surrounded black colour line of each natural fingernail plate or b) two pairs of opposite points at widest and longest section forming a tetragon shape in each natural fingernail plate is drawn

↓

Digital images of the natural fingernail plates with a or b are taken

↓

A computer program analyzes the widest and longest dimensions of a or b and to match them against to the library dimensions of the artificial nail classes to find the best fitting artificial nail class for each natural fingernail plate

↓

Each selected artificial nail is trimmed to perfectly fit to each fingernail plate boundary line from its corresponding natural fingernail

↓

Each trimmed artificial nail is precisely laid on a top of its identical untrimmed artificial nail from the same class

↓

Shape of the trimmed outlines are marked down onto the upper surface of the identical untrimmed artificial nails so the outlines are cloned.

FIG. 5 (continued)

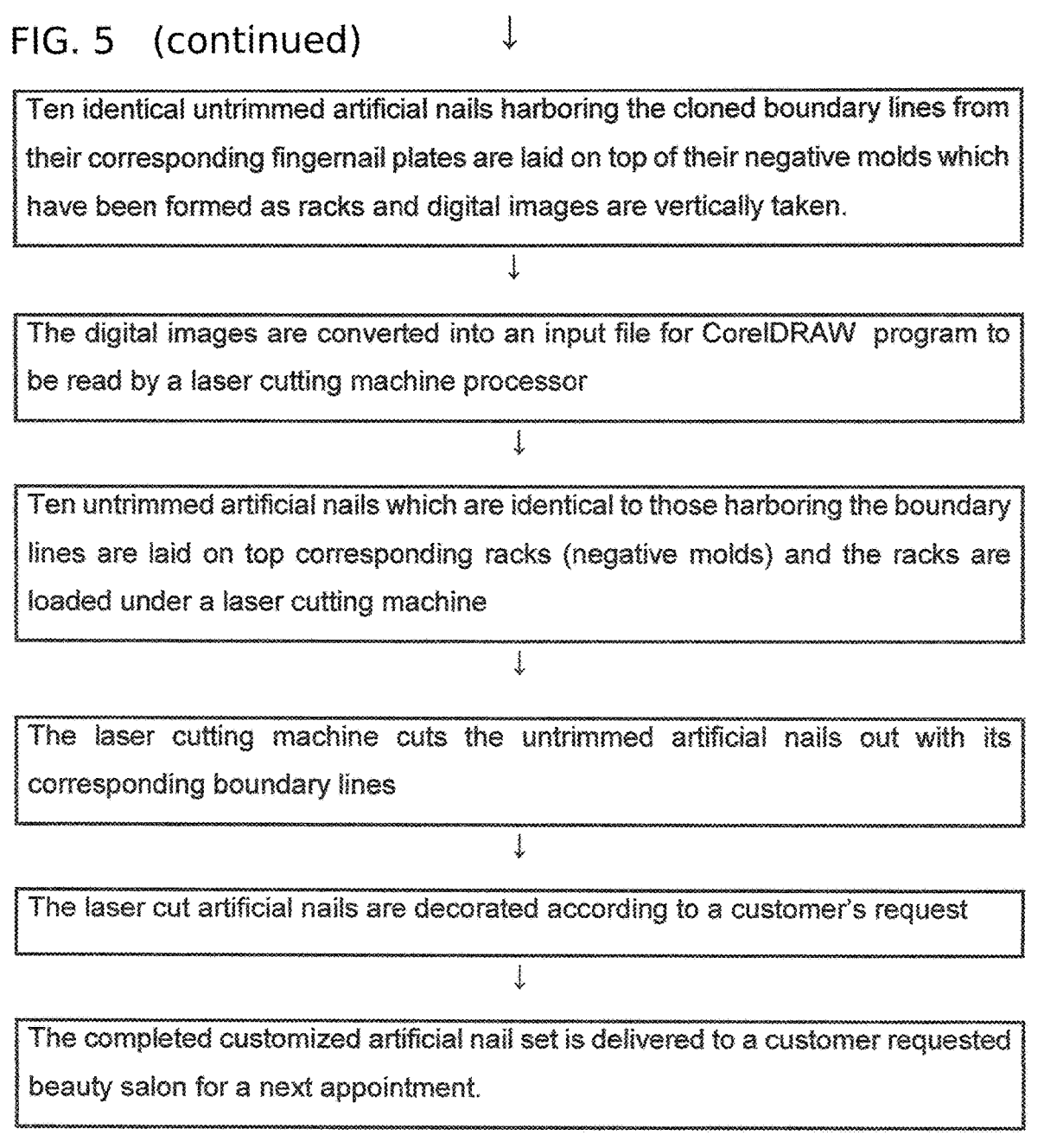

↓

Ten identical untrimmed artificial nails harboring the cloned boundary lines from their corresponding fingernail plates are laid on top of their negative molds which have been formed as racks and digital images are vertically taken.

↓

The digital images are converted into an input file for CorelDRAW program to be read by a laser cutting machine processor

↓

Ten untrimmed artificial nails which are identical to those harboring the boundary lines are laid on top corresponding racks (negative molds) and the racks are loaded under a laser cutting machine

↓

The laser cutting machine cuts the untrimmed artificial nails out with its corresponding boundary lines

↓

The laser cut artificial nails are decorated according to a customer's request

↓

The completed customized artificial nail set is delivered to a customer requested beauty salon for a next appointment.

DISTANCE AB = 294.4351 pixels = 13.30 mm

DISTANCE CD = 325.1292 pixels = 14.78 mm

1 PIXEL = 0.045 mm

ACCURACY: 0.45 mm

METHOD FOR OBTAINING AND STORING INFORMATION SUITABLE FOR PRODUCTION OF ARTIFICIAL NAILS FOR AN INDIVIDUAL

THE FIELD OF THE INVENTION

The present invention relates to a method for obtaining and storing information suitable for production of artificial (also referred to as "fake") nails for an individual. In particular, the invention discloses a method to obtain and record information characterising the shape of a trimmed artificial nail which information is sufficient to allow reproduction of the trimmed artificial nail and storing the information as well as identifying details of the individual.

PRIOR ART AND BACKGROUND DESCRIPTION

It is, of course, possible for an individual to buy artificial nails and fit these. In general these nails are relatively poor fitting. "Conventional" fitting of high-quality artificial nails involves a time-consuming fitting of artificial nails onto an individual by a nail technician, usually in a salon.

One of the most common forms is called "nail sculpturing." In this method, a pre-made artificial fingernail tip is trimmed down to the desired length and attached to the tip of a customer's real fingernail. Acrylic material is then patched little by little onto the surface of both the artificial nail and natural fingernail from the cuticle to the finish of the artificial nail. This process is repeated for each finger and also repeated every time a new set is done. The materials can be allowed to dry. A shaving/sanding process is performed to create the desired shape with a smooth finish for each fingernail. The final step of this process is to paint the top surface of the acrylic coat with the desired colour or decorative pattern.

Another method is called "nail Covering or Wrapping." A technician cuts and glues plastic pieces onto a natural fingernail. This is repeated for a few layers and a filler compound is pasted onto it to create a continuous uniform surface. This process is repeated for each finger and also repeated every time a new set is done. After intensive shaving/sanding of each nail to the desired shape, the nail can be polished. All fingernails are processed in the same way.

Another method which is similar to "nail sculpturing" is called "Finger Dipping." In this method, a natural fingernail is cleaned up and brushed by an adhesive primer. A pre-made artificial fingernail tip is trimmed down to the desired length and attached to the tip of a customer's real fingernail by an adhesive. The natural fingernail plus artificial nail is dipped into an acrylic material and then pulled out for drying. The process is repeated and each time, the top layer of the-fingernail becomes thicker. After two repetitions, an abrasive process is intensively applied to the surface to create the desired shape. This process is repeated for each finger and also repeated every time a new set is done. The final step is to paint the top surface of the acrylic coat with the desired colour or decorative pattern.

All of the above-mentioned methods disadvantageously expose customers and nail technicians to acrylic dust, filing dust, chemical liquids, and aerosol fumes, which can result in health and respiratory problems. Because these methods require a great deal of time and skill by a nail technician they are also costly. Moreover, when the growth of the natural nail after a few weeks creates a gap between the finger cuticle and the applied artificial top layer, customers will need to visit the technician for the gap to be filled, hence exacerbating the expense. Importantly, these methods require an abrasive process to occur on the natural nails to prepare a suitable surface for attaching acrylic. After 3-5 times of removal and re-service, the natural nails are severely damaged.

There are many methods which have been developed to try and improve the artificial/fake nail field. Many of these focus on 3D printing or peripheral machines to cut or create a 3D artificial nail which fits onto a natural fingernail plate. Others disclose a digitized artificial nail library which aims to match the digitized contours of a natural nail surface. However, the contours of natural fingernail plates are unique for each person. Two natural fingernail plates of the same fingers from two hands of a person are dissymmetric. Even the contour shape (boundary line) of a natural fingernail plate is different from those of other fingernail plates in the same hand. The above methods therefore still consume large amounts of time and effort for the creation of a unique artificial nail set for each customer. This issue has kept such methods away from the market and many traditional artificial nail methods are still performed in standard services.

U.S. Pat. No. 5,309,365, for example, describes to use a number of machines and equipment to cut a piece of material into the shape of an artificial nail. To do a set of artificial nails, the majority of customers do not want to spend more than 45 minutes for the service including time for decorating and cleaning up. The art of U.S. Pat. No. 5,309,365 did not mention the time consumption for cutting an artificial nail and how many devices are required to be used to produce 10 fitted artificial nails on time.

U.S. Pat. No. 7,123,983 exploits three-dimensional (3D) images of the nail surfaces to direct devices to cut/create custom fit artificial nails from raw materials. This art may produce better fitting nails for its customers than U.S. Pat. No. 5,309,365 but once again has not mentioned a time period that a customer would be required to spend.

US20060034507 is a method, process and computer program to automatically create a customized three-dimensional artificial nail object by library reference based upon an actual/existing digitized nail surface. US20060034507 does not disclose how the data for the digitized nail surface is obtained in the first place, and in particular does not outline how to find all the variations of boundary lines in their artificial nail library. If they do not trim the edges of an artificial nail, it cannot be perfectly matched to all diverse variations of boundary lines.

US20090092310 discloses a system and method for creating precision fit artificial fingernails. This document utilizes a scanned and digitized nail surface to form a precision fit, three dimensional, digitized artificial nail object that can be used to direct a machining device. This device either creates an artificial fingernail from blank stock or machines a custom mold that can be used to make multiple artificial fingernails with the same shape. One shortcoming of this art is its practicability. If 10 custom molds need to be created for each customer as proposed, a reservoir for a huge number of customers would be problematic. Especially if a customer chooses different lengths and types of artificial nail tips in different appointments. Hence, pre-made custom molds would be impractical for the production of nails with varying fashion. A further issue with the method of US 2009/0092310 is that many nails are slightly lopsided or skewed. Further, in some nails, the lateral folds cover up the nail plate lateral edges. If this is not picked up in the imaging the artificial nail produced will be a poor fit, but this will not be noticed until the fitting. At this stage it may not be possible to readjust the created artificial nail to fit accurately, or it may not be possible to adjust the artificial nail to compensate for the skewed direction of the natural nail. Further, imaging and similar methods do not take into account that natural nails change shape when artificial nails are fitted. We have found that improved fitting is obtained where the information characterising the shape of nail or which is used to create artificial nails is itself obtained from an artificial nail which has been actually trimmed and fitted to an individual's nail, as discussed further below.

Other patents which have developed different types of their artificial nail library include, for example EP1604584A1, U.S. Pat. No. 6,892,736B2, US2005450864A, U.S. Pat. No. 7,997,283B2 and WO 2015126533.

Because the high cost for these artificial nail sets, customers usually go to refill when the growth of a natural nail will create a gap between the finger cuticle and applied artificial fingernail since the artificial fingernail is bonded onto the natural nail. The refill process requires skill by a nail technician.

By the process of the present invention the costs and time for fitting of artificial nails can be reduced, the refill process can be avoided and the nails can be simply replaced by a new set regularly. Whilst almost all customers want to save time for their artificial nails service they also still expect a perfect outcome for their artificial nail set.

As well as the fitting itself, many complicated and delicate decoration options are often unattractive to the customer because of the limitation of time. Customers also require that their artificial nail set is long-lasting relative to the cost. The present invention addresses these issues.

SUMMARY OF THE INVENTION

In a first aspect there is provided a method for obtaining and storing information suitable for production of artificial nails for an individual, the method comprising the steps of:

a) Providing a first untrimmed artificial nail of length, L, width, W, and depth of curvature, D,
b) Trimming the artificial nail to fit an individual's nail,
c) Recording information characterising the shape of the trimmed artificial nail, which includes at least information defining the boundary line of the trimmed artificial nail, and which information is sufficient to allow reproduction of the trimmed artificial nail from an untrimmed artificial nail, and
d) Storing the information as well as identifying details of the individual.

We have found that the cuticle boundary of ten fingernails can be seen as personal "fingerprinting" for an artificial nail set. There is no cuticle and lateral nail fold boundary (the "boundary line" of a natural fingernail plate) that is absolutely identical between two natural fingernails in one hand. Even two boundary lines of two similar fingernails from two hands of one person are dissymmetrical. Therefore, the cuticle boundary of the same natural fingernail (thumb, index, ring finger etc.) are rarely similar between two people.

In addition, it has also been found that natural fingernail plates are quite flexible and they are slightly deformed when pressed. Therefore, when an artificial nail is applied to a natural nail some deformation and change in shape of the boundary line can occur. Although the deformation may seem relatively minor, this can nevertheless cause significant differences in the fit of an artificial nail. In particular, a consequence of this deformation is that the shape of a boundary line which is determined by non-contact methods of imaging the nail, such as in US 2009/092310, and the shape of a boundary line determined by the method of the present invention, which is based on an actual trimmed and fitted artificial nail, can differ significantly. The present invention, in particular, provides information which characterises an artificial nail which already takes into account this deformation, and hence provides a better fit.

Thus, in the first aspect of the present invention an artificial nail is selected to fit and then trimmed to provide an exact fit to an individual's nail. Then, the information characterising the shape of the trimmed artificial nail is recorded. The information recorded includes at least the information defining the boundary line of the trimmed artificial nail, and is sufficient to allow reproduction of the trimmed artificial nail from an untrimmed artificial nail. This information is then stored as well as identifying details of the individual. The information may be stored, for example, on a computer or server.

Prior to the individual's next appointment, this information can be retrieved. This enables untrimmed artificial nails of the correct dimensions (L, W, D) to be ready prior to the individual's appointment. The untrimmed artificial nails can be "pre-trimmed" prior to the appointment using the information stored. This can be to reproduce exactly the previous trimmed artificial nail or can be an initial trim to reproduce the previous trimmed artificial nail its lateral sides and cuticle bottom but its tip length will be at customer's desire with a final trim for fitting by the technician. The decoration step can also be completed prior to the appointment if the customer has selected or proposed a style in advance. In either case significant fitting time is saved. Time can be reduced to that required for removing old artificial nails, if present, and fitting the new.

The present invention reproduces the artificial nails based on the previously fitted artificial nails. This provides a highly accurate fitting, in particular including the deformation of the natural nail induced by the fitting of the artificial nail itself. This is considered to provide a more accurate fitting than methods, for example imaging, based on the natural nail surface.

The information characterising the shape of the trimmed artificial nail must include at least information defining the boundary line of the trimmed artificial nail, but otherwise can include any other information which allows reproduction of the trimmed artificial nail from an untrimmed artificial nail.

Recording the information characterising the shape of the trimmed artificial nail may include taking one or more images or copies of the trimmed artificial nail.

In one embodiment, this can include:

c1) Placing the trimmed artificial nail on a second untrimmed artificial nail of the same length, width and depth of curvature as the first untrimmed artificial nail,
c2) Marking the boundary line of the trimmed artificial nail on to the second untrimmed artificial nail, and
c3) Taking an image of the marked second untrimmed artificial nail.

In general, the information characterising the shape of the trimmed artificial nail preferably includes the values of L, W and D of the first untrimmed artificial nail of step (a). However, in some embodiments the untrimmed artificial nail can be defined by a reference number or similar that defines the untrimmed artificial nail rather than storing the explicit values of L, W and D.

In a preferred embodiment there is provided a library of untrimmed artificial nails from which the untrimmed artificial nail of step (a) is selected. In particular, there may be provided a library of untrimmed artificial nails which differ from each other in one or more of L, D and W. An advantage of having such a library is that the "starting" untrimmed artificial nail can be kept consistent for the initial fitting of step (b) and also for subsequent fittings by selecting an artificial nail of the same L, D and W. A further advantage of a library having a maximum number of different artificial nails as starting points is that a salon or supplier may be able to keep a suitable stock of all options available for its customers. The library preferably has at least 20 but no more than 1000 different untrimmed artificial nails, and usually less than 250 different untrimmed nails. More preferably the library has at least 50 but no more than 150 different untrimmed artificial nails.

A further advantage of the present invention can be obtained where the lateral edges of a nail plate are covered by lateral folds. In particular, for some nails the lateral folds cover up the natural nail plate lateral edges. The shape of the boundary line at the edges may then not be accurately captured by, for example, an image of the natural nail plate. The present invention can avoid this issue because the artificial nail used to characterise the natural nail plate is fitted to the natural nail plate directly. This advantage can be increased further by use of artificial nails which have relatively thin lateral sides (relative to the backbone or rest of the artificial nail). The relatively thin lateral sides provide additional flexibility in the artificial nail on the sides to allow fitting to leave no void between the artificial nail and lateral folds even in the case where the lateral folds cover up the nail plate lateral edges. The flexibility of both the natural and artificial nail create a unique boundary line which can then be captured by the method of the present invention.

In a preferred embodiment of the present invention the fingernail of the individual is measured prior to step (a) and the measurements used to select a subset of untrimmed artificial nails for the initial fitting.

In one embodiment, the subset may consist of a single untrimmed artificial nail which is provided as the first untrimmed artificial nail of length, L, width, W, and depth of curvature, D, of step (a).

Alternatively, the subset may comprise more than one untrimmed artificial nail and the subset is reviewed manually by the technician to select a single untrimmed artificial nail which is provided as the first untrimmed artificial nail of length, L, width, W, and depth of curvature, D, of step (a).

As an example, and in a preferred embodiment, the measurement may comprise marking the boundary line of the individual's nail and/or marking points or lines representing the maximum length and width of the individual's nail, and taking one or more images of these. The selection of the subset may then be performed from the image or images(s) using a computer program which analyses the images and outputs the subset.

Step (b) of the present invention can generally be performed in any conventional manner.

It will be understood that the process for obtaining and storing information suitable for production of artificial nails for an individual will usually be repeated for all fingernails of the individual.

In this case steps (a) and (b) are usually repeated individually for multiple, and usually all, fingernails of the individual. Steps (c) and (d) may be performed individually for each fingernail, or may be performed for more than one fingernail at a time. For example, it may be possible to record information on several trimmed artificial nails, such as the boundary lines of several trimmed artificial nails at the same time e.g. via an image or images which each include several of the trimmed artificial nails.

Once the above process has been performed there is provided in a stored form, usually on a server or computer, information for the individual which includes at least information defining the boundary line of a trimmed artificial nail which fits the individual, and which information is sufficient to allow reproduction of a trimmed artificial nail from an untrimmed artificial nail.

As noted above, prior to an individual's subsequent appointment, this information can be accessed. This can be used to select and trim one or more further untrimmed artificial nails for fitting to the individual in the subsequent appointment. This enables untrimmed artificial nails of the correct dimensions (L, W, D) to be ready prior to the individual's appointment. The untrimmed artificial nails are usually "pre-trimmed" prior to the appointment using the information stored. This can be to reproduce exactly the previous trimmed artificial nail or can be an initial trim to reproduce exactly the previous trimmed artificial nail at its lateral sides and cuticle bottom but its tip length will be at customer's desire with a final trim for fitting by the technician. The decoration step can also be completed prior to the appointment if the customer has selected or proposed a favour style in advance. In either case significant fitting time is saved. Time can be reduced to that required for removing old artificial nails, if present, and fitting the new.

Thus, in a second aspect the present invention provides a method for fitting one or more artificial nails to an individual, the method comprising:

i) accessing information which has been obtained and stored for the individual and which includes at least information defining the boundary line of a trimmed artificial nail which fits the individual, and which information is sufficient to allow reproduction of a trimmed artificial nail from an untrimmed artificial nail,
ii) using the information to select and trim one or more untrimmed artificial nails prior to the individual attending a nail fitting appointment,
iii) optionally decorating the one or more trimmed artificial nails prior to the nail fitting appointment, and
iv) fitting the trimmed artificial nail or nails at a nail fitting appointment.

The information which has been obtained and stored for this aspect may be obtained and stored using any of the embodiments described for the first aspect, such as the use of libraries of artificial nails and the marking and imaging of untrimmed nails as described. In relation to the provision of a library of untrimmed artificial nails, the untrimmed artificial nails of step (ii) of this aspect are also preferably selected from a library, and in particular the same library used for step (a) of the first aspect. This ensures consistency between the initial obtaining and storing of information and the subsequent fitting.

A particularly preferred feature of the first and second aspects of the present invention is the use of such libraries. As already noted, it has also been found that natural fingernail plates are quite flexible. Further, as also already noted, for some nails lateral folds can overlap the natural nail surface. For this reason, in a preferred embodiment an artificial nail library is provided which includes at least some, and preferably a majority, of untrimmed artificial nails formed from plastic/acrylic and designed such that the left and right curving lateral sides of the artificial nail are relatively thin, for example with the thinnest part being at the edge and being 0.1 mm.

This allows the artificial nail to become flexibly aligned to the slightly different size or shape of a real natural fingernail plate. A perfect match between a three-dimensional natural fingernails upper surface and the bottom surface of the artificial nail is not necessary. Moreover, many natural fingernail plates are lopsided, unsymmetrical or even skewed to some degree. Therefore a unique fit for each natural fingernail plate would increase designing costs and would not be acceptable for many customers.

In preferred embodiments, involving the library of untrimmed artificial nails, the present invention doesn't aim to produce each artificial nail to fit a unique topology of a natural fingernail plate. We create a real artificial nail library in which the range of sizes (W, D, L) cover almost all size variations of natural fingernail plates.

In a yet further aspect, the present invention provides a library of untrimmed artificial nails which artificial nails each have a bottom, B, tip, T, and left and right sides, LF and R respectively, and which are each characterised by their length, L, width, W, depth of curvature, D, and the thickness of their lateral sides, LF and R, wherein the untrimmed artificial nails in the library comprise at least 20 nails which differ in one or more of length, L, width, W, and depth of curvature, D from each other, and wherein at least some of the untrimmed artificial nails have a thickness of the left and right lateral sides less than the thickness at the tip, T.

Typically, the thickness of the artificial nails at the tip is 0.5 mm or more, preferably 0.6 mm or more, such as 0.6 to 2 mm, and with about 1 mm being most typical. The main part of the nail may be of similar thickness as the tip which then reduces closer to the bottom and lateral sides. For example, typically the thickness reduces towards or close to the left and right curving lateral sides, and is thinnest at the edge. The typical thickness at the edge may be 0.3 mm or less, preferably 0.2 mm or less, such as about 0.1 mm. The thickness may also reduce towards the bottom margin (where the artificial nail joins the groove/eponychium cuticle of a natural nail). Again the typical thickness at the edge may be 0.3 mm or less, preferably 0.2 mm or less, such as about 0.1 mm. The thinner edges provide flexible artificial nails which work with the flexibility of the natural nail to provide a high quality fit.

The library of artificial nails of this aspect is the preferred library for use in the preferred embodiments of the first and second aspects. Further description of the library of artificial nails is provided below and, for avoidance of doubt, applies equally to all aspects and embodiments of the present invention which relate to or use a library.

The features and advantages of the aspects and embodiments of the present invention will become apparent from a consideration of the drawings and the subsequent description. The adjective fake and artificial are synonymous in this disclosure. An "artificial nail class" includes identical artificial nails having the same W, D and L value. An "untrimmed artificial nail" indicates a fake/artificial nail that has not been trimmed (which may also be considered as a "raw" artificial nail). In this invention, we consider two artificial nails which have the same values of W/D/L as being in the same artificial nail class (or "identically classed"). However, identically classed artificial nails can be different in their tip section due to their tip styles. Different tips form different sub-classes of an artificial nail class. We use the words longitudinal and transverse cross section synonymously to cross section of the length and width, respectively. A natural fingernail plate boundary line, or simply "boundary line" is a contour line which delimitates between the natural nail plate and the surrounding tissue of cuticle, nail wall (lateral sides) and hyponychium. The words "to best fit" indicate a status where an artificial nail covers accurately a natural fingernail plate up to the boundary line between a natural fingernail plate with its surrounding tissue.

BRIEF DESCRIPTION OF THE DRAWINGS

The present invention will become more fully understood from the following description and the accompanying drawings, wherein:

FIG. 5 is a flow diagram of an exemplary process for obtaining and storing information suitable for production of artificial nails for an individual, and the subsequent distant creation of a customized fitted artificial nail set.

DETAILED DESCRIPTION

Figure 1A:
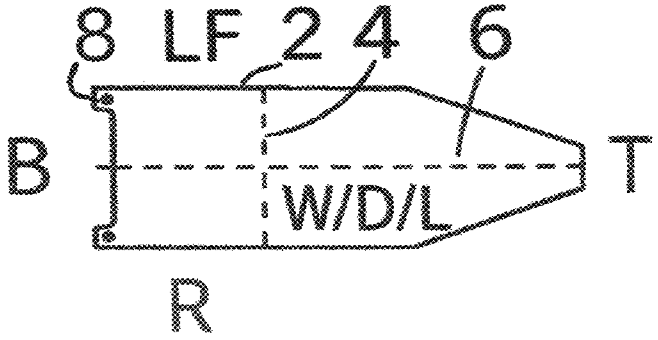
FIG. 1A is a diagrammatic view schematically illustrating the two-dimensional image of an artificial nail upper surface which shows different sections in the artificial nail.

The following descriptions of the preferred embodiments are merely exemplary in nature and is in no way intended to limit the invention, its application, or uses.

Options for Untrimmed Artificial Nails

To serve customers for an artificial nail set, we have two options for a primary material:

In a first option, there is provided an artificial nail library which mimics shapes of natural fingernail plates and covers almost all common natural fingernail variations in terms of W (width), D (depth) and L (length). Typically this will include a set of nails having values of L from 7 to 15 mm, W from 7 to 19 mm and D from 2 to 6 mm. As an example, the library may contain nails each differing by 2 mm for each of these, which would then have 5 different lengths (7, 9, 11, 13 and 15 mm), 7 different widths (7, 9, 11, 13, 15, 17 and 19 mm) and 3 different depths (2, 4 and 6 mm). If all combinations are included this gives 105 artificial nail classes. It will be apparent that not all combinations of the above may be needed, or that additional options could be included e.g. W and L may differ by 2 mm in each case, but 5 different options for D, each 1 mm apart could be used. The above are just examples therefore.

This library would generally be custom manufactured.

In a second option, it is possible to provide a library of plastic/acrylic artificial nails which are available widely from the market. In this option, before importing the artificial nails into our system, we need to measure the artificial nails to obtain and classify them by their width (W), length (L) and depth (D) values.

This option may be used in combination with the first option to provide more options. Also, in the current market, the available artificial nails do not cover all the ranges of natural fingernail variations and so this option could be combined with selected/additional options which are manufactured to fill gaps in the available nails.

Fake Nails and a Library Creation

FIG. 1A illustrates a two-dimensional shape 2 of an untrimmed artificial nail. Fake nails can, in general, be made of plastic, acrylic, metal, marble, gemstones, composite of a variety of different thermoset plastics or a similar material. An artificial nail mimics shapes of natural fingernail plates. In an artificial nail, its longitudinal cross section and transverse cross section are typically both curvatures. FIG. 1A shows a two-dimensional illustration of an artificial nail 2 which has been systemized by W, D and L value. The artificial nail has four sides shown in FIG. 1A. LF for the left; R for the right; B for the bottom and T for the tip. If an imaginary plane cuts through an artificial nail at L distance from the bottom (B), a dotted 4 line would be formed. The section from B to the dotted line 4 exhibits a first section referred as the "L section" of an artificial nail where its lower surface will be glued onto a natural fingernail plate. The length (L) of this section will usually vary between 7-15 mm depending on the artificial nail sizes. Meanwhile if an imaginary plane cuts thought the central longitudinal cross section of an artificial nail, the dotted 6 line is formed and divides the artificial nail into two symmetrical halves.

An artificial nail structure has two distinctive surfaces, upper and lower surface. The lower or under (bottom) surface has two clear sections. The first section (length L) where the artificial nail is glued onto an upper surface of a corresponding natural fingernail plate (after the artificial nail is selected and trimmed). The second section is the extension forming a tip part which is usually manufactured at constant length. All of the painting, designing and other decorative structures are performed on the upper surface. The curvature of the lower and upper surface is preferably different, and the thickness of an artificial nail is different in different regions of the artificial nail.

An untrimmed artificial nail can be any natural or mixed colour. We do not rule out a certain colour of an artificial nail, but we prefer light white or transparent/translucent ones to opaque white.

W, L and D may be shown numerically printed or engraved on the surface of an artificial nail in its mass production (FIG. 1A). For example, 11, 10, 3 would indicate an artificial nail which has a width (W) of 11 mm; length (L) of 10 mm and depth of curvature (D) of 3 mm.

The length (L) corresponds to the size of the natural nail the artificial nail is designed to fit. Generally, the thickness of an artificial nail along the centre of its longitudinal cross section increases from the bottom part (B) and is thickest at the point be joined to the tip of the natural nail i.e. corresponding to the natural nail length. Thereafter an artificial nail is typically fairly constant in thickness along the centre of its cross-section. Thus, L is defined, and can be measured, in such nails as the distance from the bottom part (B) to the point where the centre of its longitudinal cross section stops increasing in thickness.

Figure 1B:
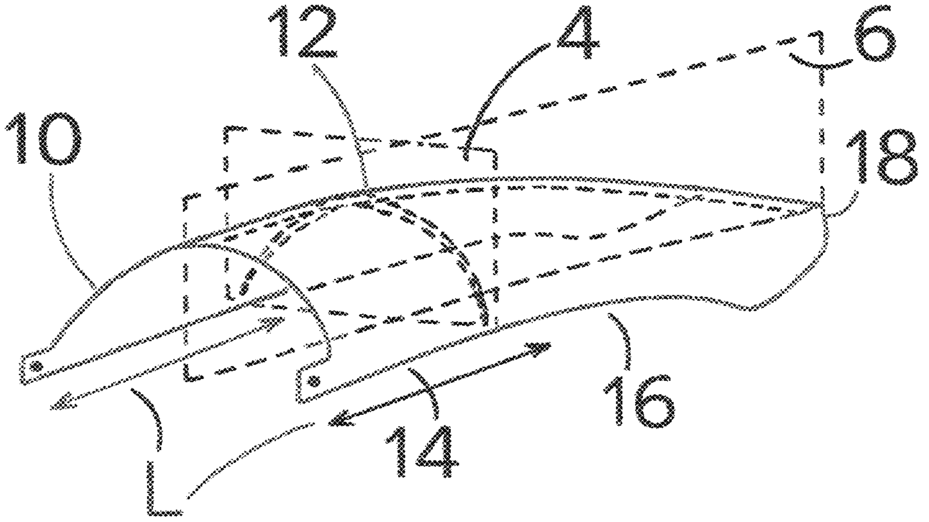
FIG. 1B is a diagrammatic view illustrating the perspective three-dimensional topology of the artificial nail.
Figure 1C:
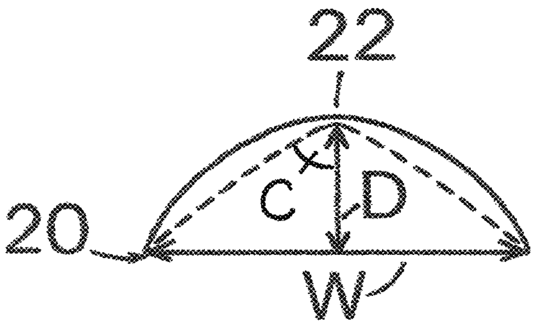
FIG. 1C is a transverse cross section view of an artificial fingernail, with a view from the bottom of the artificial nail.
Figure 1D:
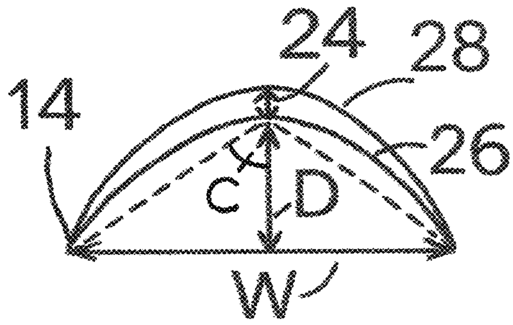
FIG. 1D is a transverse cross section view of the artificial nail, with a cut thought the artificial nail at L distance from the bottom of the artificial nail.
Figure 1E:
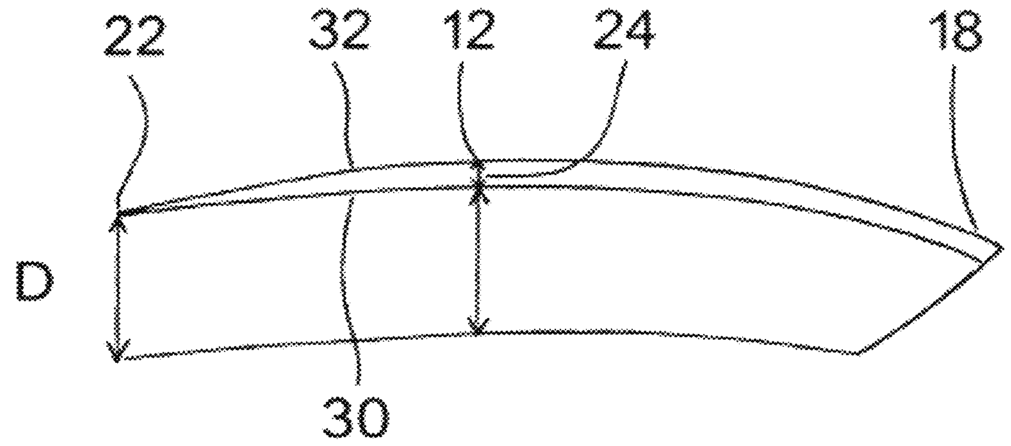
FIG. 1E is a central longitudinal cross-sectional view of the artificial nail.
Figure 1F:
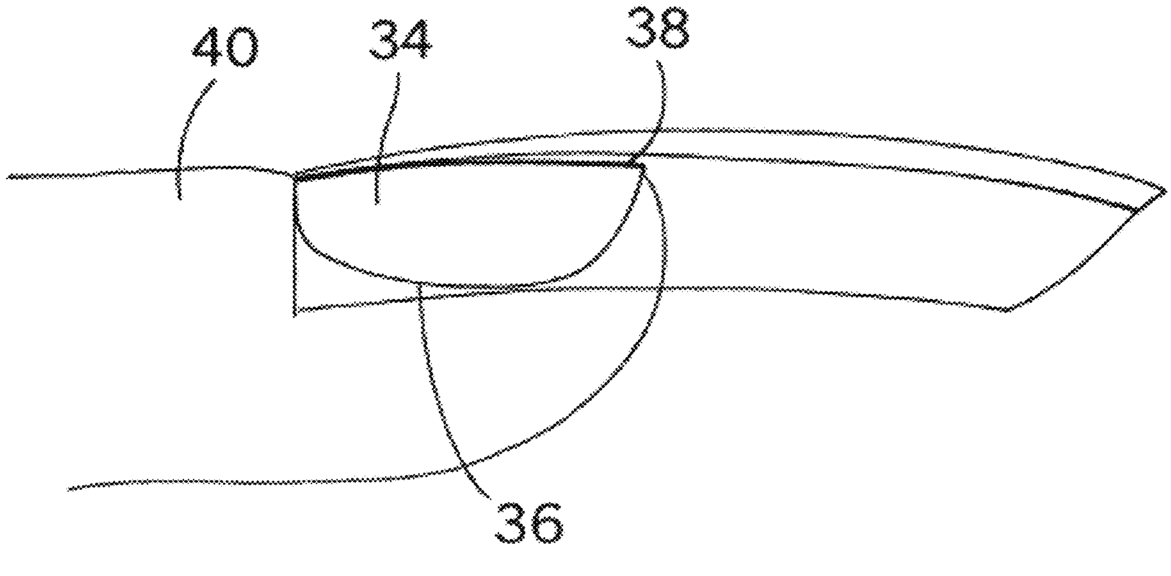
FIG. 1F is a central longitudinal cross-sectional view of the artificial nail when it covers a natural fingernail plate.

As noted above, the L value indicates the length from the starting edges (B/bottom) to the dotted line 4 in an artificial nail (FIG. 1A) and also being the length of a section where an artificial nail is glued onto its corresponding natural fingernail plate (FIG. 1F). This means that L value of an artificial nail is also similar to the length of a corresponding natural fingernail plate where it to be glued on. The depth (D) of its curvature is illustrated in FIGS. 1C and 1D. The depth of curvature (D) and width (W) of an artificial nail are usually constant from the root (B) of nail to the dotted line 4 at length L. Where this is not the case the values of D and W should be measured at the bottom of the untrimmed nail (B). After the dotted line 4, the values are usually variable depending on the certain fashion/design of an artificial nail tip. For example, the shape of a nail tip can be row, pointed, twisted, straight, curving up or down or square shape. A nail tip can be cut to a desired length or a desired fashion style to meet the request of a customer but its standard length in an untrimmed artificial nail may typically be about 30 mm. A customer can choose a tip design/style from artificial nail sub-classes. Depending on the trend of fashion/design, an artificial nail class can have one tip style or many different tip styles (sub-classes). Tip variations do not have any effect to the method of the present invention because only the bottom part (B) and two lateral side (LF and R) are required to be trimmed to fit a natural fingernail plate.

In a preferred embodiment at the bottom margin of an artificial nail (B) where an artificial nail joints the groove/eponychium cuticle of a fingernail 10, the thickness is similar in the entirety of its spline shape and is 0.1 mm. In the edges of the two lateral sides (LF, R), the thickness is also 0.1 mm (FIG. 1B). From the bottom margin (B) and two lateral sides (FIG. 1C, D), the nail becomes thicker to a maximum value of 1 mm as the nail extension reaches the dotted line 4. If an imaginary plane cuts through the artificial nail at the dotted 4 line, the top point of the transverse cross section curvature is 12. In detail, FIG. 1B illustrates a perspective three-dimensional topology of an artificial nail. The thinnest region of an artificial nail is where the nail contacts either the cuticle 10 (B—bottom) or to the sides, LF (left) and R (right) along with the L section 14. From the thinnest regions in two lateral sides (LF, R) 14 and bottom (B) 10 the artificial nail gradually becomes thicker and the thickest (1 mm) is achieved at the end of L section toward to the tip part (see from 22 to 12, FIGS. 1E and 14 to 24, FIG. 1D), However, at the curved bottom of the artificial nail (B) the thickness is constant at 0.1 mm 10, 20, 22 (FIG. 1B, C). The difference between FIG. 1C and FIG. 1D shows that the degree of curvature created by the transverse cross section of the upper and the lower surface is not the same. The upper surface curvature 28 gradually varies (has a greater upwards curve) as an artificial nail becomes thicker between 22 and 24, 12 (see more detail in FIG. 1B, C, D, E). Meanwhile, the transverse cross section of the upper and the lower surface is the same at the bottom (B) because the thickness of this whole section is 0.1 mm. After reaching 12, the thickness is sustained up to the nail tip (T) 18. Section 16 is the two lateral sides beyond the L section 14 which usually has the same thickness of 14 (0.1 mm), but the thickness can be changed altogether, with variations of tip design. Along the dotted line 6, after reaching a thickness of 1.0 mm at the central of an artificial nail (FIG. 1B, D), the thickness is sustained for any further extension towards the artificial nail tip. We do not rule out, however, that at the farthest section of a tip, the thickness can vary.

FIGS. 1E and F shows the central longitudinal cross section of an artificial nail. FIG. 1E shows longitudinal cross sections of both lower and upper artificial nail surfaces which are slightly curved lines. Any difference between an upper surface of a natural nail and a lower artificial nail surface can be filled by a thick glue. To draw a similar curve to the one in FIG. 1E by mathematics, we may coordinate points on the desired curve to (x, y) axis. For an artificial nail curve, we may use a data set of 5 points to establish these curves. The first three points are 22, 12 and 18. The other two points are the middle of 22 and 12 and 12 and 18. The absolute length of an artificial nail between the nail root (B) 22 and 12 as abovementioned is generally between 7-15 mm depending on nail sizes, Meanwhile, the length between 12 and 18 can be up to 30 mm. If the length of L section is 7 mm, the middle point of 22 and 12 is 3.5 mm from each point; if the length of L section is 15 mm, the middle point of 22 and 12 is 7.5 mm from each point and so on for the other sizes. The tip section length from 12 to 18 is generally manufactured at 30 mm, and the middle point between 12 and 18 is then 15 mm from each point. In the example section (Example 01), we will describe in more detail of how to re-construct a three-dimensional topology of an artificial nail surface, either upper or lower surface. In brief, the transverse cross sections of an artificial nail lower surface 26 (FIG. 1D) are similar at any length of the artificial nail extension. The longitudinal cross sections of an artificial nail lower surface are also similar at any cut because the transverse cross sections of an artificial nail lower surface are a part of a circle that passes through three vertices of an isosceles triangle which has been formed by the W value as the triangle's base and D as its mid-perpendicular which is equal to the D value of an artificial nail. From 5 points aforementioned, after establishing a curvature which goes through the five points from natural nail plate observations, a coordinate axis (x, y) for each of the points can be constructed. In the example, we use a function in Python Numpy package called polyfit to fit a degree polynomial to those 5 points and produce a corresponding curve. When this curve is coordinated in different z values which use 5-7 different points locating the transverse cross section circle, they produce a three-dimensional topology of an artificial nail lower surface. The more points in z axis are used the smoother a surface is created. We use Python fitting libraries to fit all the polynomial functions at different points on the z-axis to create an output data set. This data set is then used in a CAD software to design an artificial nail lower surface mold. In the case to construct the artificial nail upper surface, the process is similar. However, the transverse cross section curvature 28 (FIG. 1D) is not part of a circle therefore the longitudinal cross section curvatures depending on greater or smaller upwards curve are different. This means that x and y axis of each of the five points above mentioned would vary in each cut. Each curve for a z-axis coordinate has 5-7 points on its transverse cross section curvature 28 (FIG. 1D) are varied accordingly. Finally, Python packages are used to link all the polynomial functions of degree 4 at different coordinates (x, y, z) and to create an output data set for running in a CAD software to design an artificial nail upper surface mold.

From observing thousands of customers, we found that the width (W) of a natural fingernail plate varies between 7-19 mm (FIG. 1C, D). For artificial nail production, we can divide this range into classes from W7 to W19, such as 7 classes in which the two closest classes differ by 2 mm.

A third value is the depth (D) of an artificial nail curvature which is shown in the transverse cross section (FIG. 1C, D). We have observed that the minimum and maximum depth that can be made is 2 mm and 6 mm respectively. Again we can divide this into classes. For example where each class differs by 2 mm this then forms a range of 3 classes numbered as D2, D4 and D6.

Due to variations in W and D, C can also differ (FIG. 1C, D), where the C angle at the triangular vertex depends on both the W and D values via the following equation:

$$\tan C/2=W/2D=Y;\ C=Y \text{ converted value} \times 2$$

These equations can be used to calculate a C angle from W and D, and it provides an alternative for constructing a lower surface of an artificial nail.

Altogether, a library of untrimmed artificial nails includes different classes differing in the W, D and L values. The combinations of L, W and D values that differ by 2 mm noted above forms 105 different classes (5×7×3). These 105 classes have made a library which covers almost all variations of our thousands of customer's natural fingernails.

FIG. 1D shows clearly the structure of an artificial nail of its transverse cross section which cuts the artificial nail at the end of L section. The section is thinnest in the left and right lateral sides (0.1 mm) 14 meanwhile it is thickest at 1.0 mm 12, 24 in the middle "backbone" 6 or longitudinal cross section of the artificial nail. (FIG. 1B, D, E).

FIG. 1E shows a structure of an artificial nail displaying a longitudinal cross section. It is thinnest (0.1 mm) in the section joining to the cuticle of the root of a fingernail 22 (B) and gradually reaches a maximum (1.0 mm) after prolonging 7-15 mm depending on a nail size from the bottom (B) 12, 24. In the remaining region towards the fingernail tip, the thickness is usually constant at 1.0 mm. The thickness of farthest tip section can vary due to different fashion/designs however and we do not prefer to limit this variation.

In most of the cases, the longitudinal cross section in a natural fingernail plate (FIG. 1F) has a slight downwards curvature, especially when grown to a longer length 34. The longitudinal cross-section in a natural nail is generally slightly curved downwards in the first 4-8 mm from cuticle and then curves further down to a maximum of 10° (degrees) at the tip. The longitudinal cross-sectional curvature of an artificial nail will generally align with this natural fingernail plate curvature. A natural thumb nail is usually straighter than the other four fingernails but when grown to a longer length, also gradually curves down, extending to the tip.

In the present invention we do not aim to produce an artificial nail with a lower surface precisely fitting a three-dimensional natural fingernail upper surface. The strategy of our innovation disclosed herein is to create an artificial nail to best fit the cuticle boundary (contour line) of a natural fingernail 36, any differences (small cavities) between the natural fingernails upper surface and artificial nails lower surface 38 (FIG. 1F) can be compensated by a thick glue such as Acrylics, Plastic glue thick, Metal Wood Plastic Javis Red etc. When the thick glue is solidified by either solvent evaporation or by using UV light, it unifies the artificial nail, the thick glue foundation layer and the natural fingernail plate into one solid structure. We prefer to use more than one glue for linking an artificial nail to its corresponding natural fingernail plate, a thick glue and a thin glue. Specifically, one thick glue is used to fill the cavities then another thin glue is used to fill any micro holes as well as providing more bonding between the artificial nails lower surface 38 and the thick glue on the natural fingernails upper surface. A number of suitable glues are known and widely used.

The library of artificial nails may be formed by injection molding. Injection molding is very common method to be used for artificial nail mass production which can be found at cosmetic plastic firms.

Figure 7A:
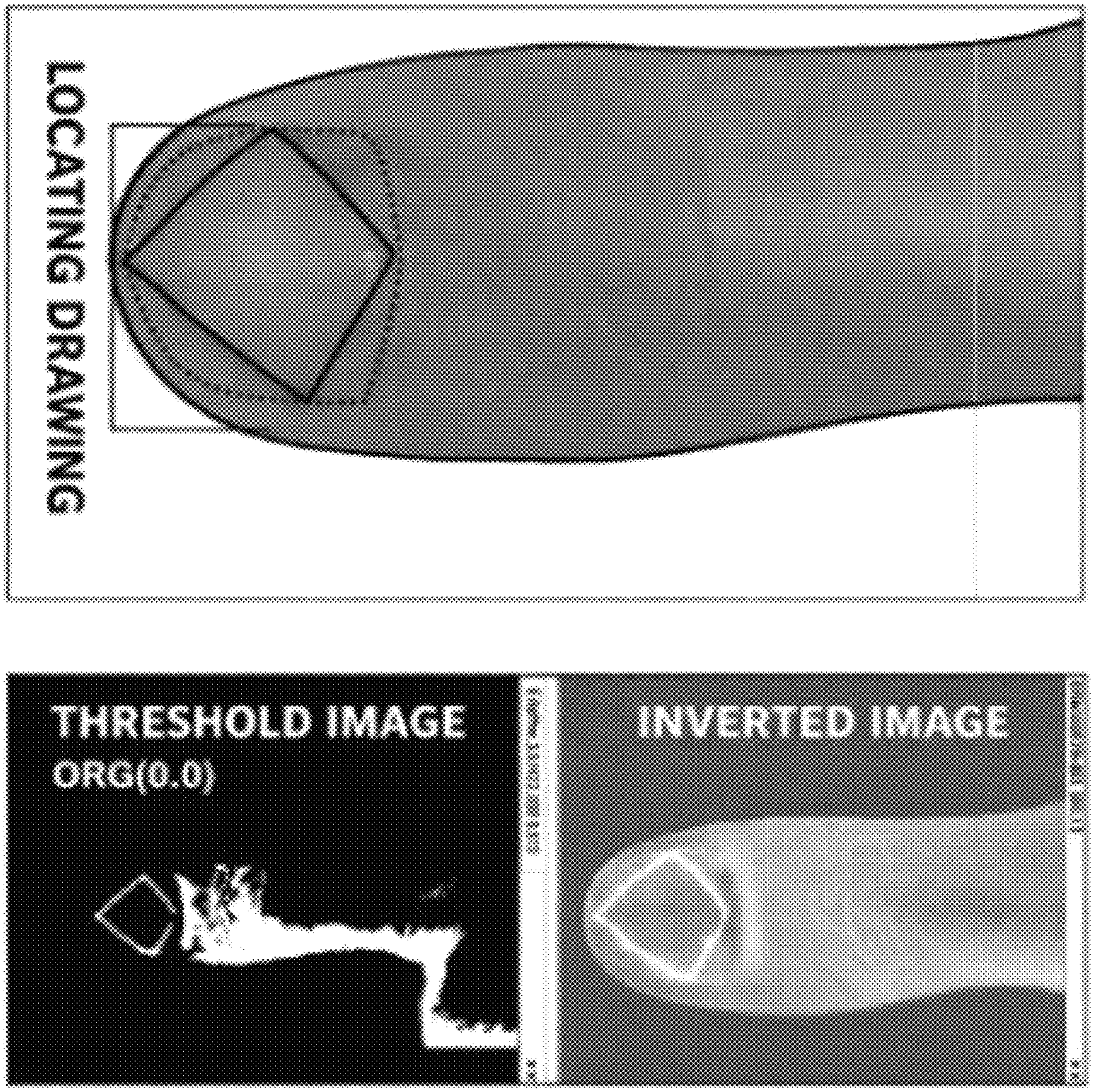
FIG. 7A is a DEMO program for measuring natural fingernail plate dimensions.
Figure 7B:
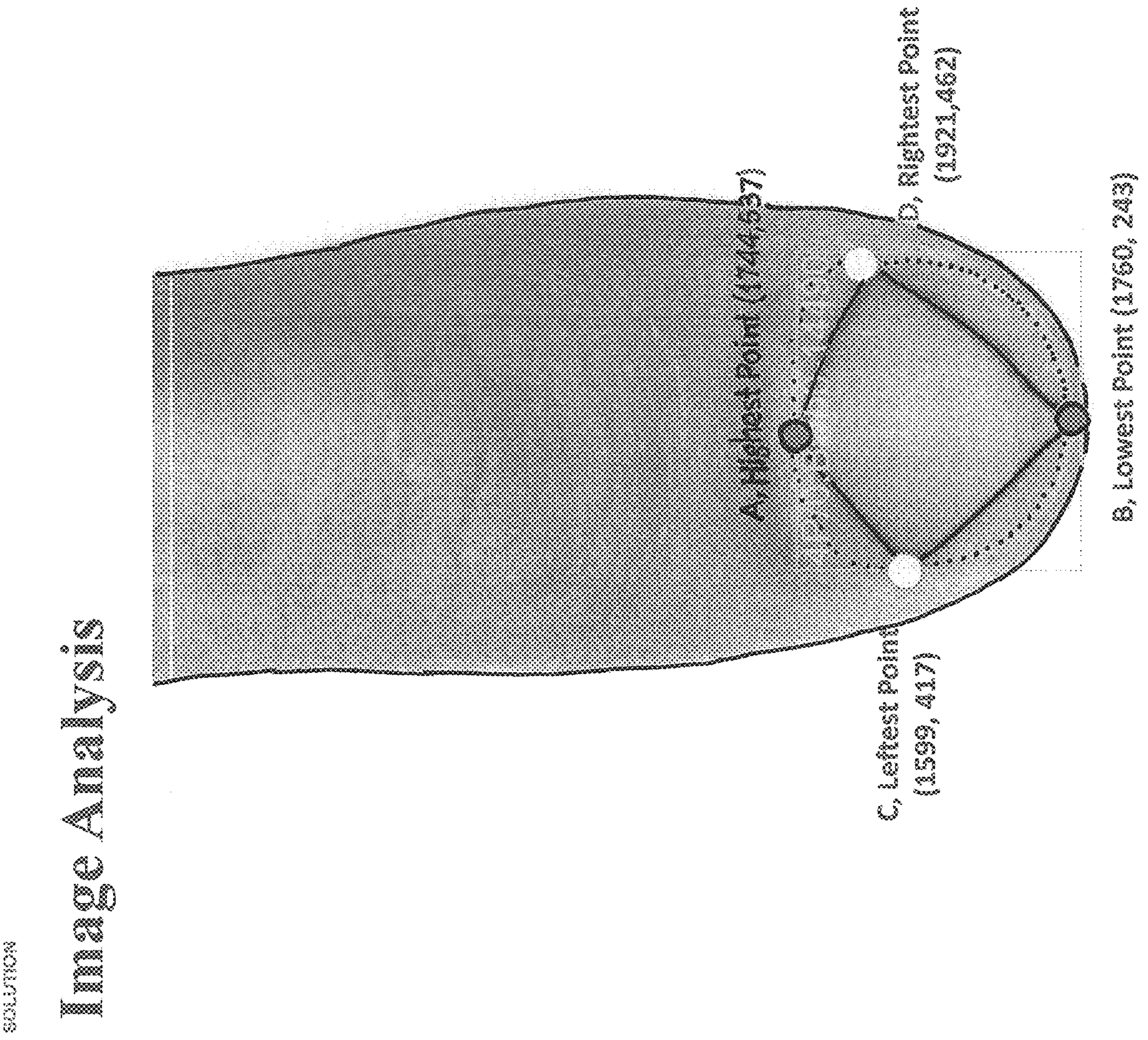
FIG. 7B is an example of the DEMO program performing fingernail plate measurements.

Customized Artificial Nail Identification: Size Selection and ID Data Set for Future Reference In a preferred embodiment of the present invention, in a first appointment, the natural fingernail plates of an individual are cleaned and excess skin removed so that the nail plate boundary area are clear. A nail technician may then use a fine, usually black, pen to draw a line along the boundary line of the cuticle and lateral nail fold of each natural fingernail plate. Consequently, this correctly develops 10 contour lines on the customer's 10 natural fingernail plates. In situations with limited time, a technician can simply choose four sites on a nail plate wherein two opposite sites mark the widest dimension of the nail plate and two other opposite sites mark the longest dimension of the nail plate. Even in some nails where the lateral folds cover up the nail plate lateral edges, the widest dimension of the nail plate can be manually marked onto lateral edges which would measure a real width of the nail. (FIG. 2C; FIG. 7A, B).

Figure 2A:
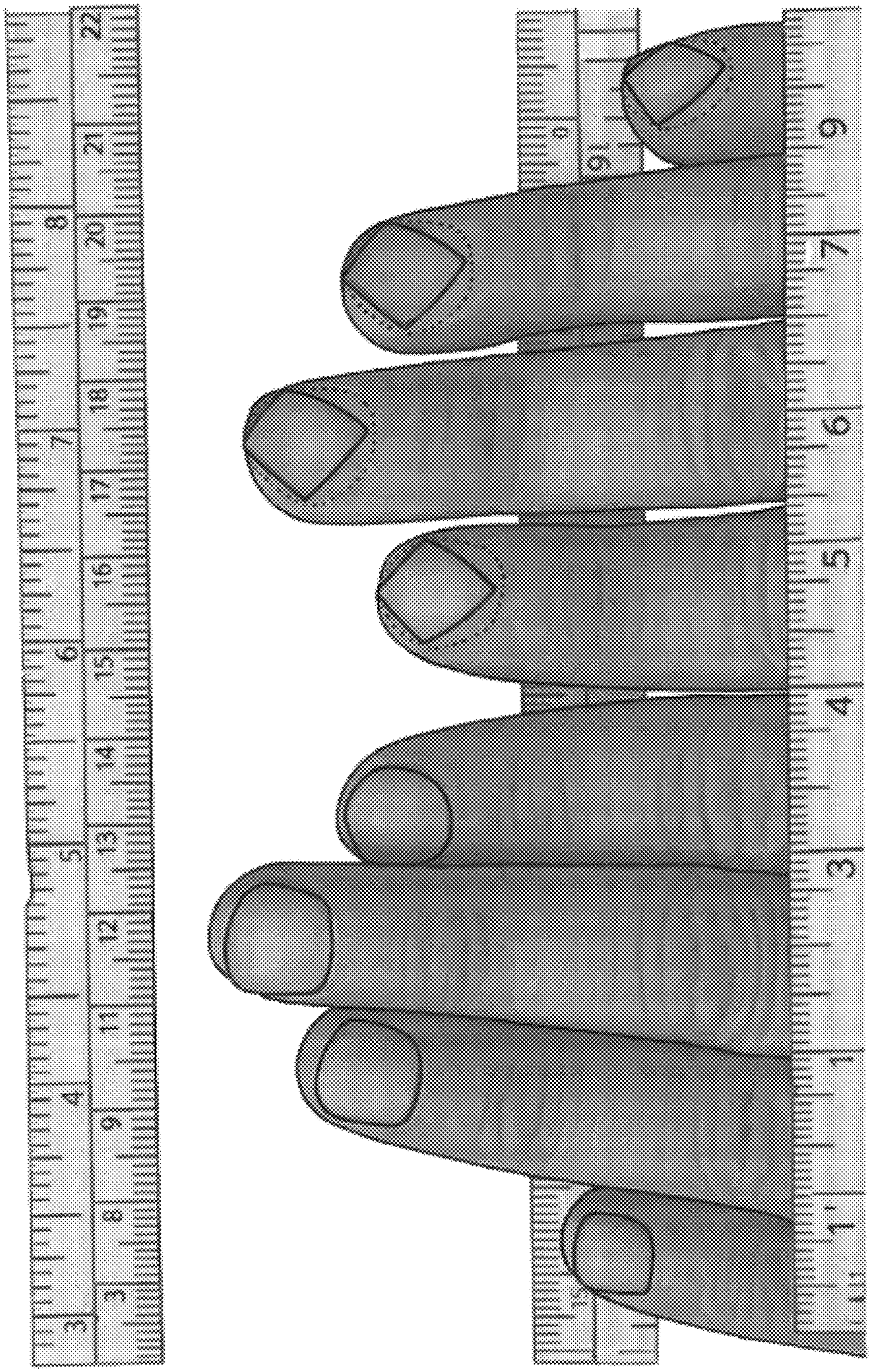
FIG. 2A is a digital image of eight natural fingernails of an individual wherein the fingernail plate boundary outlines or the widest and longest dimension of the plates have been marked.
Figure 2B:
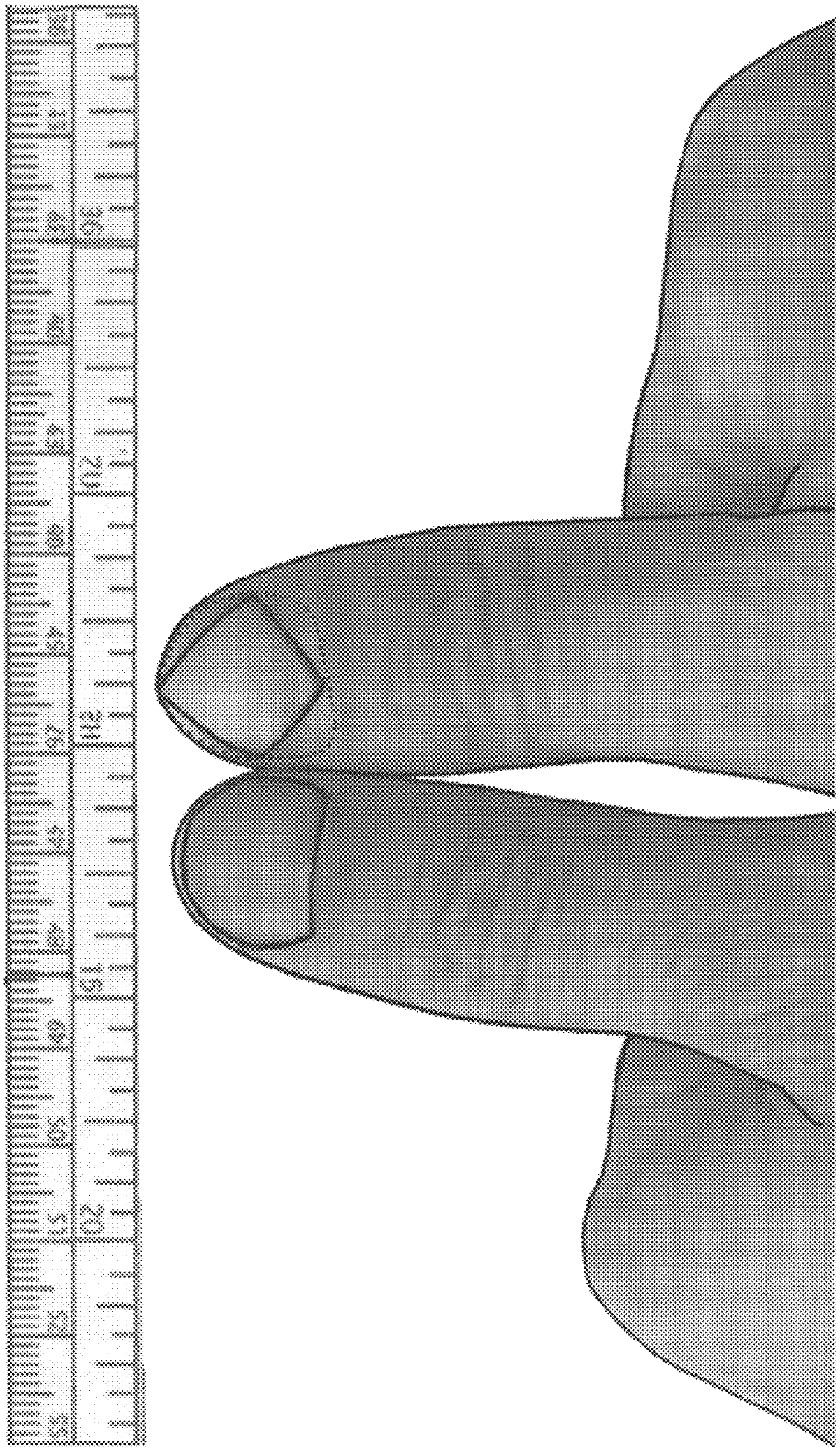
FIG. 2B is a digital image of two thumb natural fingernail plates of a customer wherein the fingernail plate boundary outlines or the widest and longest dimension of the plates have been marked.

The sequence is repeated for all ten natural fingernail plates of a customer. The drawn line can be of any contrasting colour to the natural fingernail plate colour. A two-dimensional, digital colour image of the upper side of two hands of the customer is captured from above, preferably with a ruler/measuring apparatus in frame. FIG. 2A shows the nail plate digital image of the natural fingernails in two hands of a customer excluding the thumbs. FIG. 2B shows a digital image of two thumb nail plates from the same customer. A digital camera 44 is connected to a processor 46. Digital photos of natural fingernail plates with the boundary outline or the tetragon shape 42 are taken. It is preferred that the distance between the digital camera and the nail plates is constant, but the rulers on the table surface are an internal controller for the exact measurement of each nail plate (FIG. 2A, B, C).

Figure 2C:
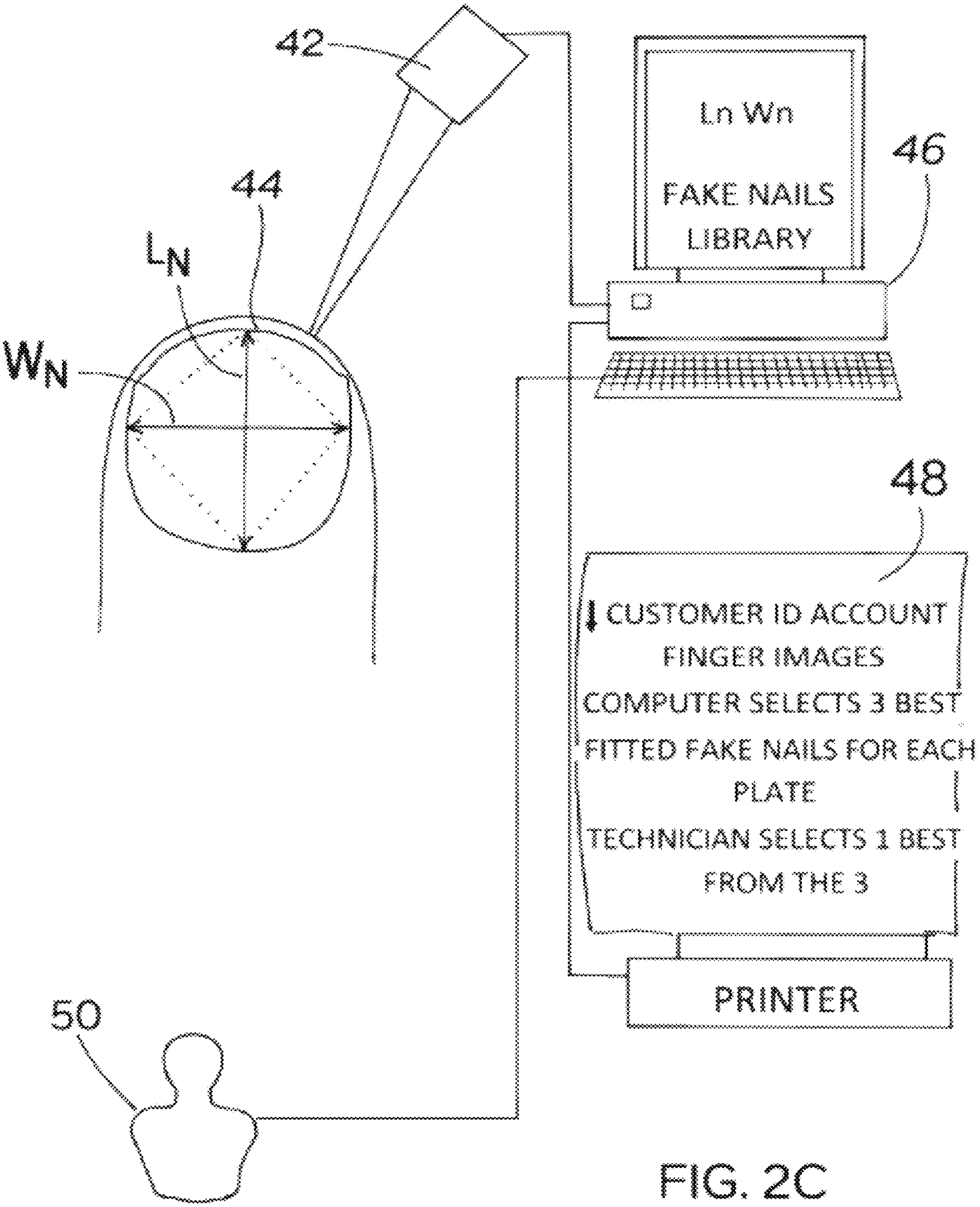
FIG. 2C is a diagrammatic view illustrating a natural fingernail plate $L_n$ and $W_n$ size and a process to find its best fit artificial nail from an artificial nail library and storing the data into a customer's account.

There are a number of software programs which can be used for measuring the boundary outline 42. In an example section at the end of this application, we will show a DEMO program that we will use to measure in real-time, the natural fingernail plate of a customer which been precisely surrounded by a black boundary outline. We use image analysis methods such as: Inverting (Black-White), Thresholding to focus on the shape, Blob analysis to detect a black boundary outline location and Distance Measuring. All these methods are based within VisPro Software. Using this software (a VisPro Basic image analysis tool; a VisPro Blob Analysis Tool; a VisPro Measurement Tool) allows us to measure the image of fingernails in the same plane. Eight fingernails as shown in FIG. 2A can be measured instantly at the same time. Additionally, this program can measure eight fingernail plates with an error of only 0.45 mm. The width of a natural (n) fingernail ($W_n$) can be defined as a widest distance between left and right side of a fingernail. Meanwhile, the length of a natural (n) fingernail ($L_n$) can be measured from the cuticle at the bottom of the nail to the end of nail plate (Hyponychium) 42 (FIG. 2C). The $W_n$ and $L_n$ of natural nail plates are automatically and quickly measured from 8 nail plates in FIG. 2A and from 2 nail plates in FIG. 2B. For digital imaging of any quality (high or low), the black contour of each fingernail plate is enough for detecting $W_n$ and $L_n$ values for each plate. The obtained 10 digital $W_n/L_n$ values are automatically matched up to W/L classes in the artificial nail library. In our preferred library each W/L pair value can be found in combination with three different D values (D2, D4, D6). This means that for each $W_n/L_n$ pair value, the processor 46 will find 3 best fitting artificial nail classes 48. It will be apparent that if a different number of D values are available then further options will be selected. This step is performed in seconds by the processor and an output file 48 will be stored and printed out. Because each selected W/L pair artificial nail exists in a limited number of D sizes, a nail technician 50 can simply select each different D value of the chosen W/L pairs (e.g. W/L/2, W/L/4 and W/L/6) to try on the corresponding natural fingernail plate of the customer to find a best fit. The result is an artificial nail wherein all three values (W/L/D) best fit to the corresponding natural fingernail plate. The sequence is repeated for all ten natural fingernails of a customer (FIG. 2C). The identity (W/L/D) of the 10 artificial nails 2 which has been matched to the 10 corresponding natural fingernail plates of the customer is recorded by the processor and uploaded to the customer's account 46, 48. In any nail set done for this customer in the future, the recorded data helps to automatically indicate 10 similar (W/L/D) artificial nails from a library without the attendance of the customer. We define this is the "artificial nail size selection" step.

The main method to determine the best D value is to allow a technician to manually align each customers' fingernail plate to each of the three selected artificial nails. However, we do not rule out in the scope of this invention that three-dimensional topology images of each natural fingernail can be obtained, for example using a 3D scanner, and the depth of each natural fingernail plate ($D_n$) can be measured from its 3D images.

Trimmed and Fitted Artificial Nails

Figure 3A:
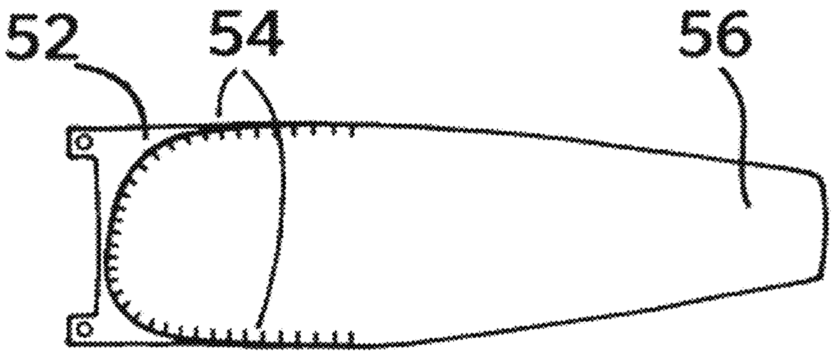
FIG. 3A is a diagrammatic view schematically illustrating an artificial nail having been trimmed to fit to a corresponding natural fingernail plate boundary line.
Figure 3B:
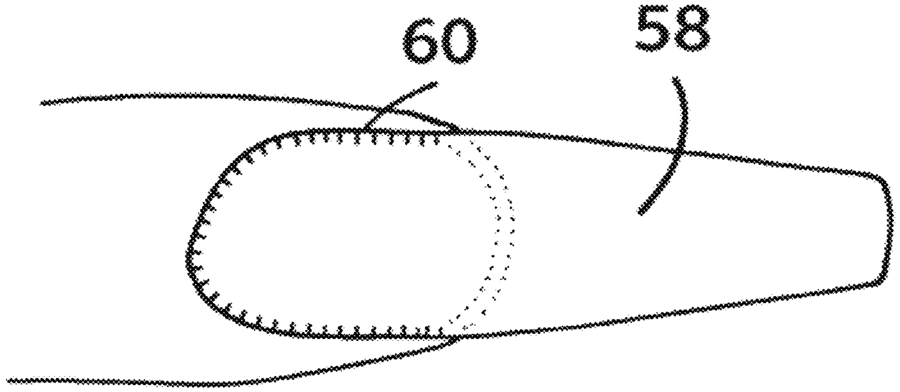
FIG. 3B is a diagrammatic view schematically illustrating an artificial nail has been aligned/fitted on its corresponding natural fingernail plate after the artificial nail has been trimmed to fit to the fingernail plate.

Following the artificial nail size selection step, a technician trims the edges of each selected artificial nail 2 to exactly fit to the cuticle and lateral nail fold boundary (the contour line of a natural fingernail plate) of its corresponding natural fingernail (FIG. 3A, B). It has also been aforementioned that natural fingernail plates are quite flexible and they are slightly deformed when pressed. Although the deformation may seem relatively minor, this can nevertheless cause significant differences in the fit of an artificial nail. The press and trim helps the thin edges of an artificial nail completely align into the lower edge of the cuticle layer and the lateral folds even in the cases where the lower surface of a fake nail and the upper surface of a natural nail plate is not topologically identical.

Initially, the tip part (T) of the artificial nail 56 is not trimmed but can be trimmed later to the customers desire. Eventually, a trimmed artificial nail 58 is aligned perfectly to the boundary line of the corresponding natural fingernail plate 60. This process is repeated for all ten fingers. Finally, the ten uniquely shaped artificial nails fabricated by the technician are available to be fitted for the customer on the first appointment. However, we prefer to collect shaping information from the trimmed set for cloning it for any future appointment.

Using Artificial Nails to Copy Natural Nail Plate Boundary Lines

In our preferred embodiment the trimmed artificial nail may be laid over an identical untrimmed nail, and the boundary line drawn on the untrimmed nail. This is described below although it will be apparent that other methods may be used to record the boundary line information.

Figure 4A:
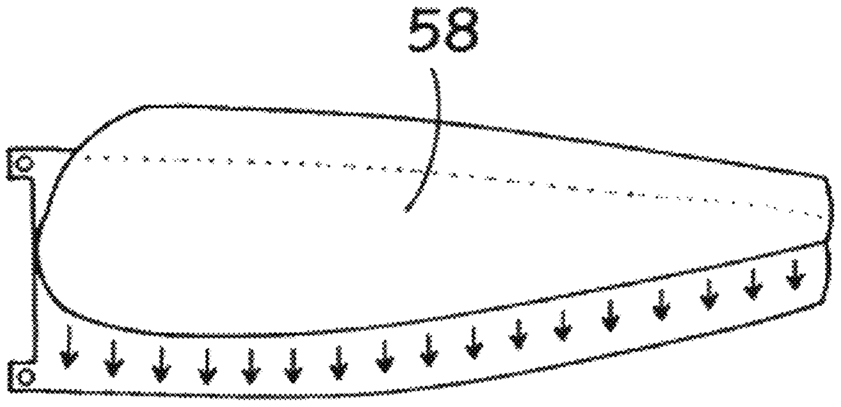
FIG. 4A is a diagrammatic view schematically illustrating the trimmed artificial nail being laid down overlapping on its identical untrimmed artificial nail.
Figure 4B:
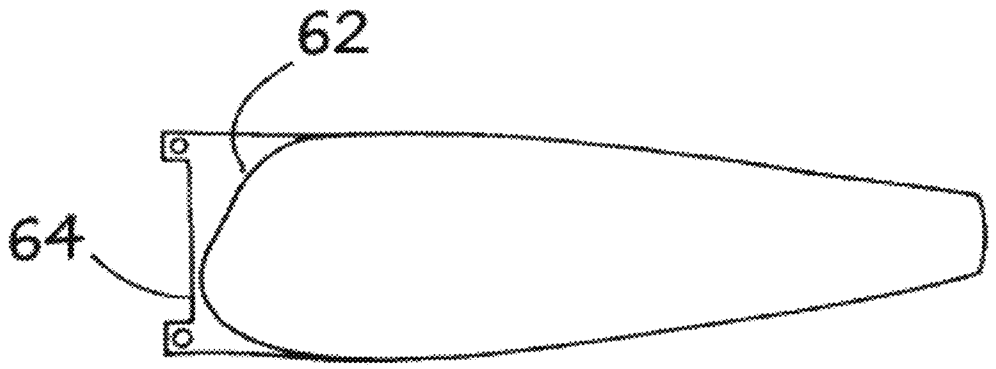
FIG. 4B is a diagrammatic view schematically illustrating the outline of the trimmed artificial nail has been marked down onto the upper surface of its identical untrimmed artificial nail, so the trimmed outline is cloned.

A trimmed artificial nail is precisely laid, overlapping its identically untrimmed artificial nail 2 (FIG. 4A), and the outline of the trimmed shape marked onto the upper surface of the identical artificial nail 2 using a permanent fine line (e.g. 0.1 to 0.4 mm) dark ink pen (FIG. 4B). The marked line can be of any contrasting colour to the artificial nail colour. The marked-down line 62 shows the separation between two parts (FIG. 4B), one part identical to the trimmed artificial nail 58 and the second part, 64 the section to be removed. This process is repeated for the remaining trimmed artificial nails. In general, ten unique natural fingernail plate boundary lines of a customer have been used as standard markers to precisely trim ten artificial nail outlines for their best fit and then the ten trimmed outlines are cloned/copied onto the upper surface of ten similar classed artificial nails. The ten trimmed shapes/outlines are used as standard markers to produce ten identically classed artificial nails for any new made to measure nail set. The ten unique boundary lines form a personal standard fingernail marker set for each customer and are then digitized for any future cloning step.

Figure 4C:
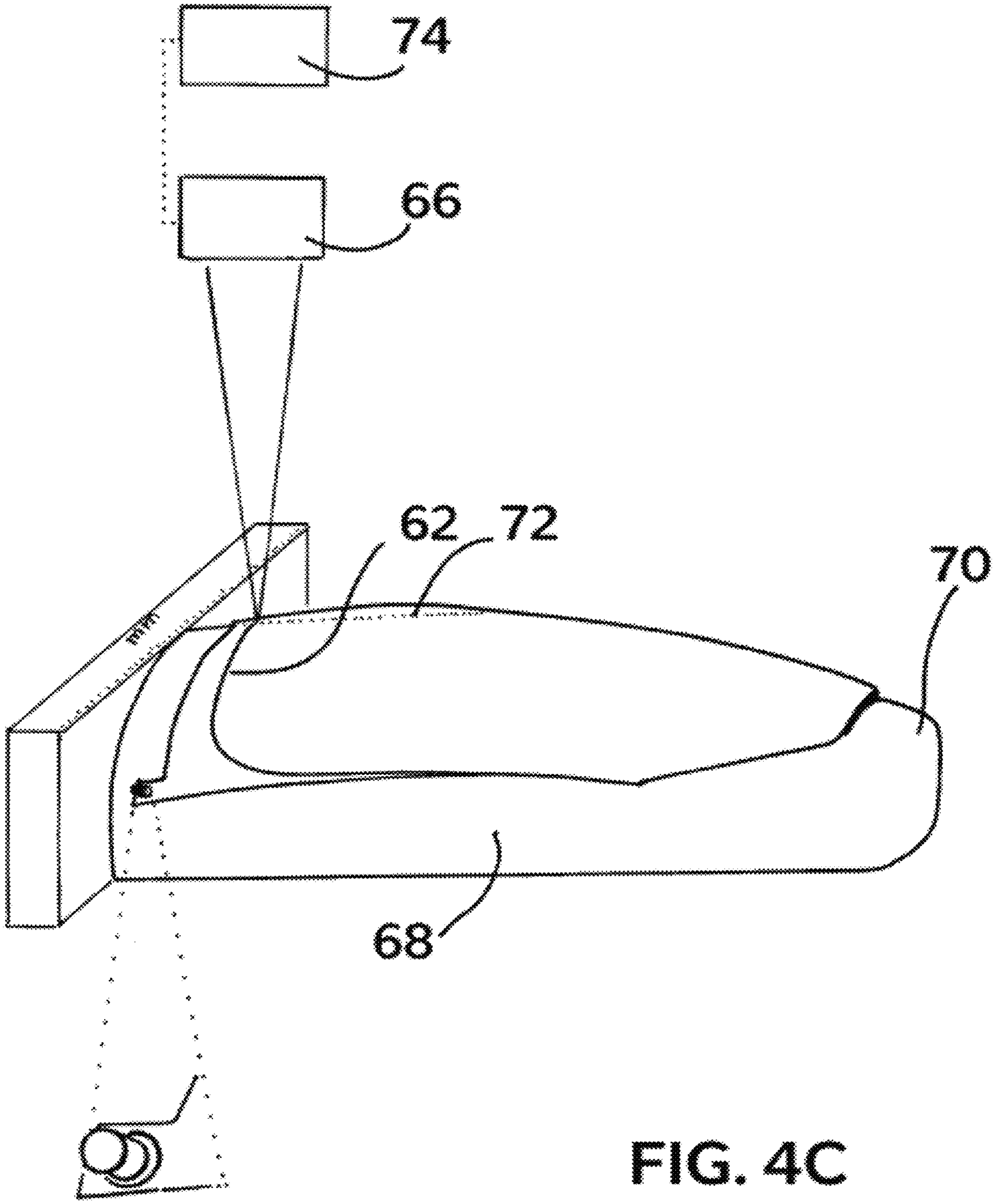
FIG. 4C is a diagrammatic view schematically illustrating the untrimmed artificial nail containing the trimmed outline (natural fingernail plate boundary outline) laid on its negative mold which has been formed as a supporting rack under a vertical focal of a digital camera or a laser cutting machine.

The unique boundary line from each trimmed artificial nail needs to be recorded. Typically, this information is digitized. To do so, a two-dimensional digital image of an artificial nail's upper surface which has been marked with a unique boundary line 62 is taken by using a digital camera or analog 66 (FIG. 4C). This step can be performed at any time after the first appointment. We also have an option for significantly reducing time of the first appointment, in which the trimmed artificial nails are quickly cloned, for example by using a machine similar to a key duplicating machine. The cloned one will be laid over an identical untrimmed nail, and the boundary line drawn on the untrimmed nail at any time after the first appointment.

In our preferred embodiment a marked artificial nail is laid on a corresponding rack 68 shown in FIG. 4C. This rack has an internal ruler in millimeters. The exact sizes of an artificial nail are therefore comparable on the internal ruler. The upper part of the rack is a three-dimensional negative mold 70 (FIG. 4C) to which its topology is identical to the three-dimensional bottom surface of the corresponding artificial nail. It means that the mold size has the same value of W/D/L to the bottom surface of its corresponding artificial nail class 2. An artificial nail with a certain W/D/L value would therefore perfectly align to/overlap its corresponding W/D/L negative mold and firmly be positioned on the top of it (FIG. 4C). The number of negative molds is therefore equal to the number of artificial nail classes which is 105 in our exemplified embodiments. A rack for each artificial nail class has been made to allow for an imaginary line 72 which goes through 22 and 12 to be parallel to the floor level. This characteristic allows an artificial nail, when positioned on the top of its corresponding rack, to be cut accurately using a laser cutting machine. The designed data which uses to establish a three-dimensional topology artificial nail lower surface is also used to create a corresponding upper surface of a rack. A rack is created to "piggyback" a corresponding artificial nail according to its precise shape and form.

An advantage of laying an artificial nail marked 2 with a unique boundary line 62 on a top of the corresponding negative mold 70, 68 is to calibrate the processes of obtaining two-dimensional digital images which contains the unique boundary line. The fixed/measurable distance from a focal position or laser beam 74 to an immobilized artificial nail object needs be calibrated so that the size of the unique boundary line which is cut out is identical to its digital image dimensions.

After the digital images of ten untrimmed artificial nails marked 2 with the corresponding unique boundary lines 62 have been taken. The file may be converted, for example to CorelDraw input files, and uploaded into the customer account. From now on, a customized artificial nail set can be created and decorated without limitation in time and location. The input files can be used for a laser cutting machine in the workshop of a beauty salon or can be used for a distant cutting machine. The laser cutting machine with the input files can precisely cut out the unique boundary line on each corresponding artificial nail. A new copy of a customized trimmed artificial nail set can be created in a few minutes. If a laser cutting machine is in a distant location, the input files need to be downloaded from the customer's account to the machine. The ten untrimmed artificial nails which have been selected in the "artificial nail size selection" step 48 need to be picked up from the local artificial nail library and loaded onto their corresponding racks and adjusted in the same way in which the images in the input files were taken. The laser cutting machine would then do the rest of the job.

An artificial nail which has a marked boundary line 62 can also be used as a marker for a technician to manually and externally produce a similar artificial nail without the attendance of the customer. We prefer to use a laser cutter, but we do not rule out the possibility of using nail technicians to clone a new artificial nail set from the first standard set marked with unique boundary lines when there are fewer customer orders.

From the second appointment onwards the stored information may be used. As an example, the information can be stored in a customer accessible account. A customer can use a customer ID to log into their account, and then view and choose any nail sub-classed fashion style, colour, decoration, surface design and nail material to order. The two-dimensional digital images of the customer's fingernails, which had been taken in the first appointment are uploaded into the customer's account. From these, the customer can use their computer or smart phone to pick different artificial nail styles or decorations/designs to paste on their fingernail images. These help customers to preview a suitable design or style based on their skin colour or other preferences. Customers are able to perform orders from any location saving time and money. A customer account may also allow the customer to upload a nail style which may not be available in the system to request for an order.

After receiving an order from a customer, a new, decorated, made-to-measure artificial nail set is produced accordingly. The requested nail set may be created and delivered to a nail fitting salon and quickly glued on for the customer on the appointment day. In some embodiments the customer may select the salon for the fitting from a list of available salons. This advantage greatly improves nail service for up 20-30% of customers who are travelling or working in different places and can provide service to any customer whose nail references are in the system. Hence, they can visit different salon locations and still be served.

At the current traditional artificial nail service, a customer needs to spend between 45 to 60 minutes for an artificial nail set. Using our method, it may only take 10 to 20 minutes for a returning customer to finish an artificial nail set in the second appointment. Moreover, a complicated or specially designed artificial nail set would need more than 60 minutes to produce. Our method has resolved this contradiction, allowing a customer to order any decoration or artificial nail drawing style from the second appointment. A pre-ordered artificial nail set can be created and unconventionally decorated with unlimited time by talented artists from any location, even from different countries. Using this invention, an artificial nail set can be unique in beauty, design and style.

EXAMPLES

Figure 6A:
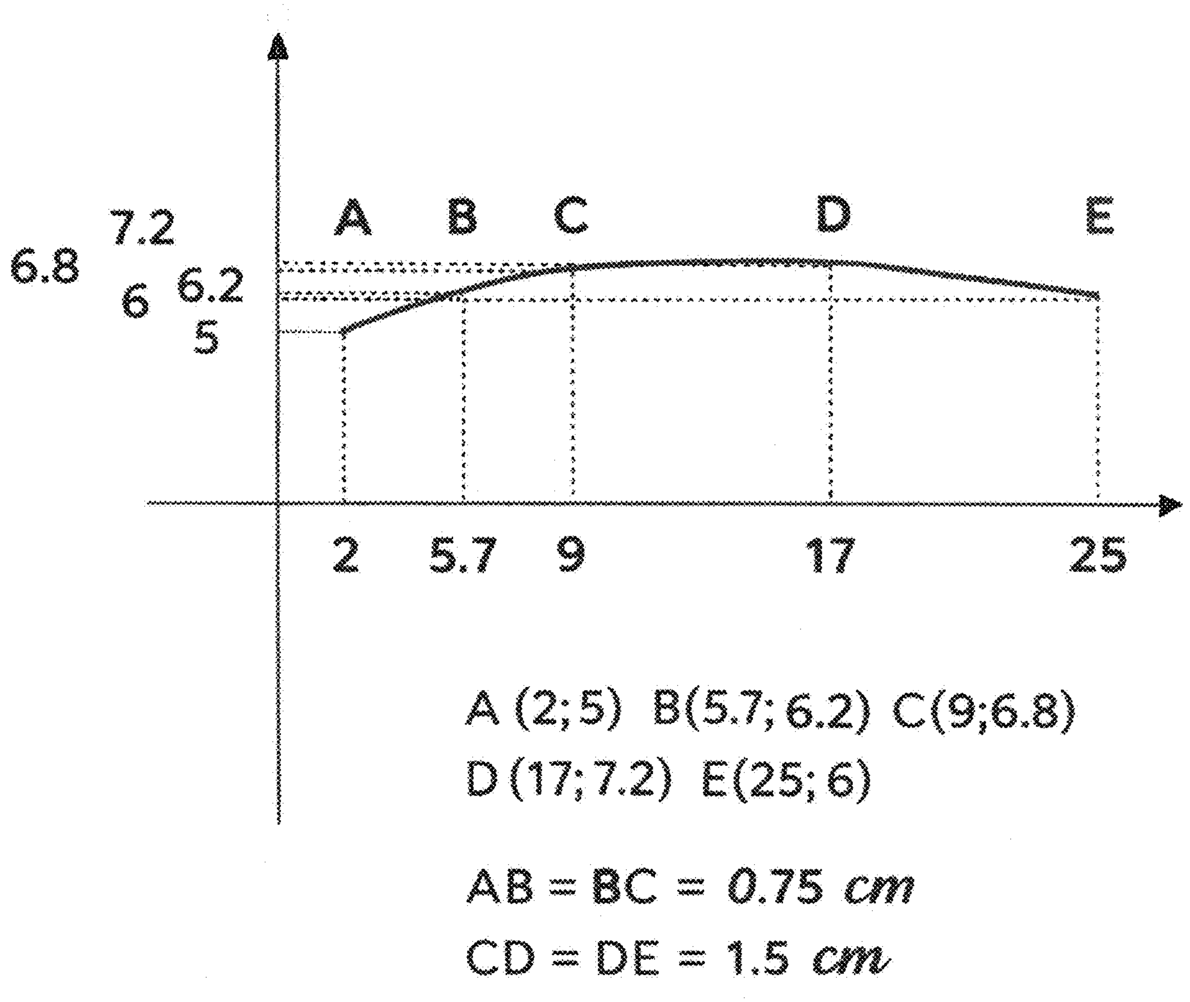
FIG. 6A is a longitudinal cross-sectional view of an artificial nail

Example 01. The Use of the Polynomial Function and Python Numpy Package (Polyfit) to Produce Nail Curves This example shows the algorithms and the process which can be used to design an artificial nail and its corresponding negative mold rack for the 105 artificial nail classes library. With reference to FIG. 1E five points are selected [22; the middle of 22 and 12; 12; the middle of 12 and 18; 18]. In FIG. 6A these are represented as A, B, C, D and E. A coordinate axis (x, y) for each point is developed, in this case A (2, 5); B (5.7, 6.2); C (9, 6.8); D (17, 7.2); E (2.5, 6). The actual dimension is as follows: AB=BC=0.75 cm; CD=DE=1.5 cm.

Figure 6B:
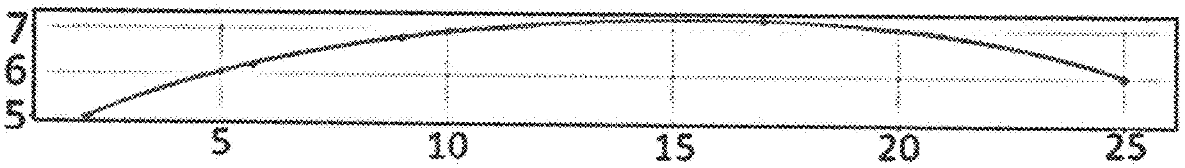
FIG. 6B is an artificial nail longitudinal cross sectional reconstructed by a polynomial function.

We use the polynomial function below to reconstruct the ABCDE curvature (FIG. 6B).

The polynomial function of degree 4 are:

$$-2.708e-05x^4 + 0.001492x^3 - 0.03991x^2 + 0.5678x + 4.013$$

Figure 6C:
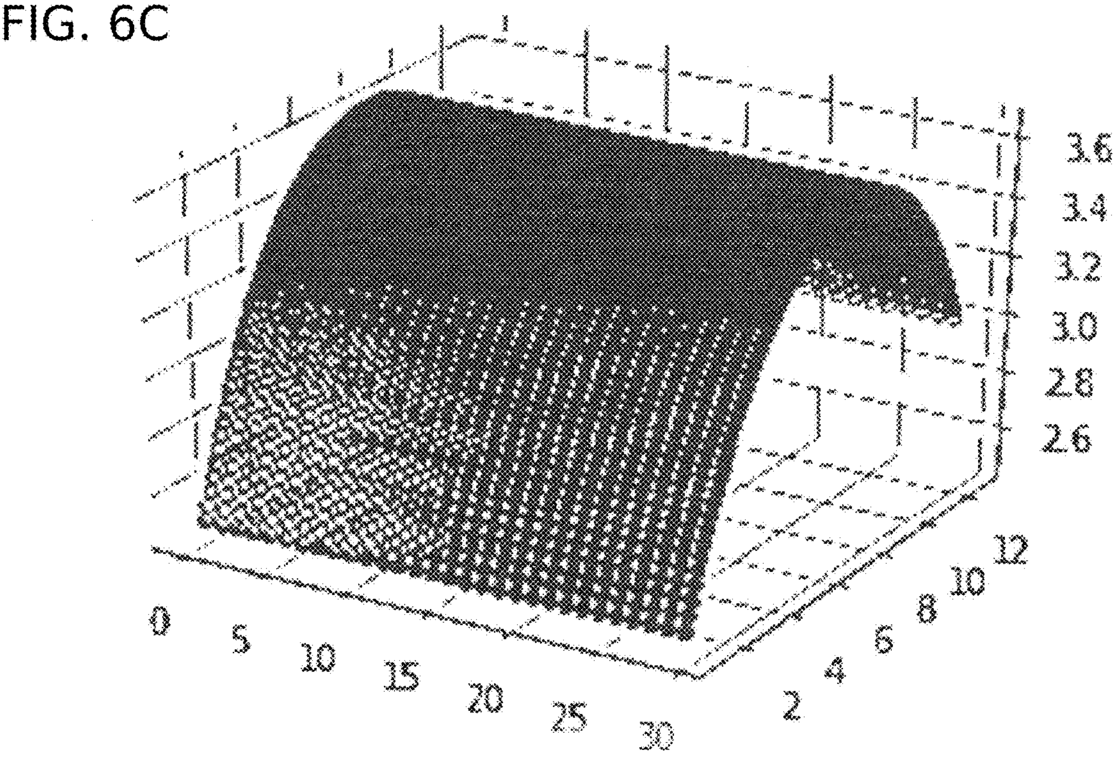
FIG. 6C is an artificial nail three-dimensional topology lower surface

For the lower surface of an artificial nail, if a number of similar curves in FIG. 6B are coordinated at different z axis, they would can create a three-dimensional topology lower surface of an artificial nail in FIG. 6C.

Figure 6D:
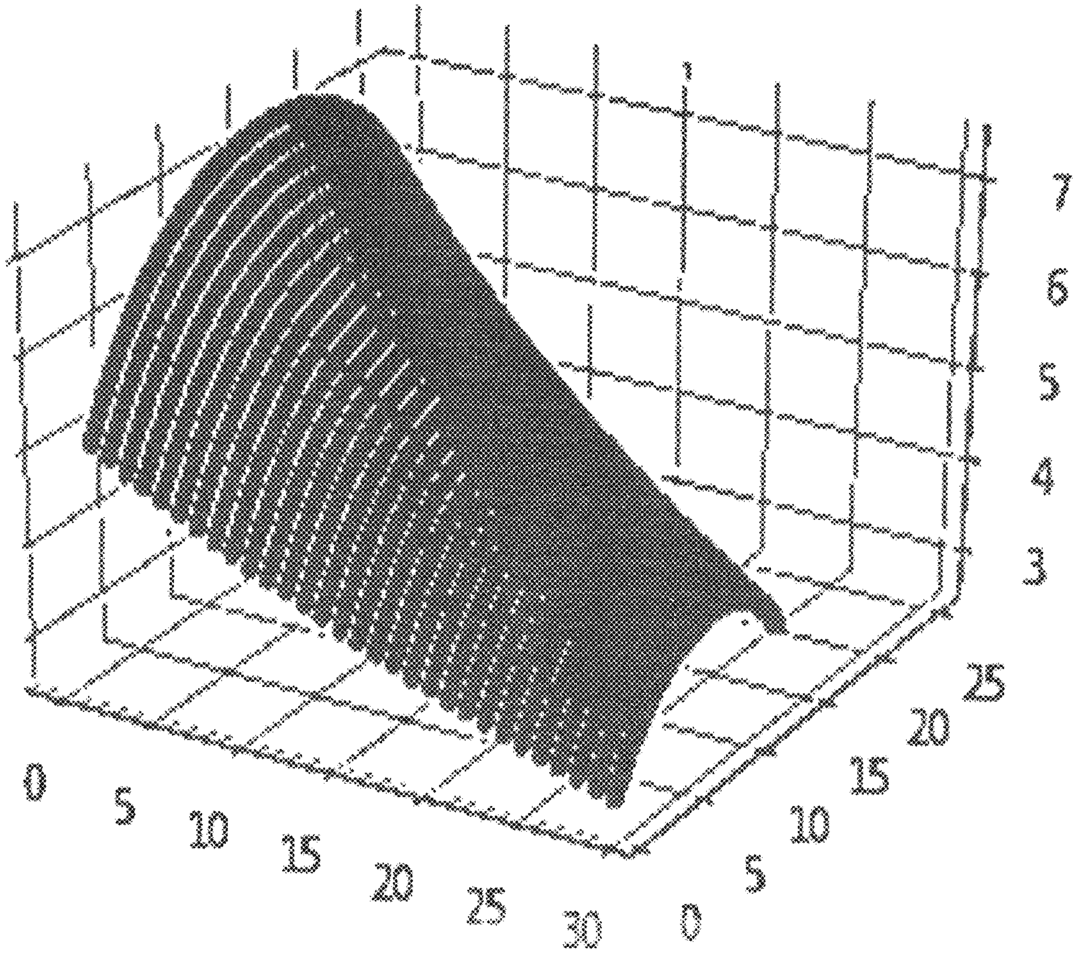
FIG. 6D is an artificial nail three-dimensional topology upper surface

The upper surface is more complicated to reconstruct because three (x, y, z) coordination's are varied in each location. FIG. 6D doesn't not show a completed artificial nail upper surface that we designed but the principle is similar. When the thickness of an artificial nail changed from 0.1 mm to 1 mm, the (x, y) axis for each of the five points are also varied in each longitudinal cross section cut. The z axis is also changed accordingly. To create a smooth three-dimensional topology upper surface, 5-7 curves as shown and used for the lower surface in FIG. 6B are not enough. Because (x, y) axis is varied in each of five points, we need to establish between 15-20 curves using the polynomial function of degree 4 aforementioned.

The above polynomial function use one data set of 5 points to reconstruct the ABCDE curvature (FIG. 6B). That means that there is only one curvature of the lower surface longitudinal cross section is formed. We do not limit a scope of this invention that for some special natural fingernail plates, the ABCDE curvature may need to be modified for a better fit. This means that the coordinate (x, y) axis values of the above five points can be modified accordingly and its consequence would add more nail classes to the current 105 artificial nail classes.

Example 02. The Use of VisPro to Measure Natural Fingernail Plate Dimensions This example shows a DEMO which has been developed by Advanced Vision Automation. A VisPro Software allows to measure the widest and largest region of an artificial nail whatever they show in a state of a black boundary outline of a natural nail plate or a tetragon shape which has two pairs of opposite vertices indicating the widest or largest dimension of a natural nail plate (FIG. 2A, B, C; FIG. 7A, B). Measurements can be performed on images or real-time. The outcome result is programmed to match up to the W/L values of the artificial nail library to find the best fit artificial nail classes for the natural nail plates.

We claim:

1. A method for obtaining and storing information suitable for production of artificial nails for an individual, the method comprising the steps of:

a) providing a first untrimmed artificial nail of length L, width W, and depth of curvature D, wherein the first untrimmed artificial nail has a tip, T, a bottom, B, and a left lateral side LF and a right lateral side R, respectively, wherein a thickness at the tip T of the first untrimmed artificial nail is greater than a thickness of the left lateral side LF and the right lateral side R, wherein the thickness of the left lateral side LF and the right lateral side R is same, b) trimming the first untrimmed artificial nail to fit an individual's natural nail plate, wherein the trimmed artificial nail is fitted to the individual's natural nail plate directly, c) recording information characterising the shape of the trimmed artificial nail, which includes:

at least information defining a boundary line of the trimmed artificial nail, and which information is sufficient to allow reproduction of the trimmed artificial nail from an untrimmed artificial nail, C1) placing the trimmed artificial nail on a second untrimmed artificial nail of the same length, width and depth of curvature as the first untrimmed artificial nail, C2) marking the boundary line of the trimmed artificial nail on to the second untrimmed artificial nail, and C3) taking an image of the marked second untrimmed artificial nail, and d) storing the information as well as identifying details of the individual.

2. The method according to claim 1, wherein recording information characterising the shape of the trimmed artificial nail includes taking one or more images or copies of the trimmed artificial nail.

3. The method according to claim 1, wherein the information characterising the shape of the trimmed artificial nail includes the values of L, W and D of the first untrimmed artificial nail.

4. The method according to claim 1, wherein the thickness of the artificial nail at the tip is 0.5 mm or more, preferably 0.6 mm or more, such as 0.6 to 2 mm, and the thickness at the bottom, and at the left lateral side and the right lateral side is 0.3 mm or less, preferably 0.2 mm or less.

5. The method according to claim 1, wherein the first untrimmed artificial nail is selected from a library of untrimmed artificial nails which differ from each other in one or more of L, D and W, said library having at least 20 but no more than 1000 different untrimmed artificial nails.

6. The method according to claim 5, wherein the library has at least 50 but no more than 150 different untrimmed artificial nails.

7. The method according to claim 5, wherein a fingernail of the individual is measured prior to step (a) and the measurements used to select a subset of untrimmed artificial nails.

8. The method according to claim 7, where the subset consists of a single untrimmed artificial nail which is provided as the first untrimmed artificial nail of length L, width W, and depth of curvature D, of step (a).

9. The method according to claim 7, where the subset comprises more than one untrimmed artificial nail and the subset is reviewed manually to select a single untrimmed artificial nail which is provided as the first untrimmed artificial nail of length L, width W, and depth of curvature D, of step (a).

10. The method according to claim 7, wherein the measurement comprises marking the boundary line of the individual's natural nail plate and/or marking points or lines representing the maximum length and width of the individual's natural nail plate, and taking images of these.

11. The method according to claim 10, wherein the selection of the subset is performed from the image(s) using a computer program which analyses the images and outputs the subset.

12. The method according to claim 1, wherein the steps (a)-(d) are repeated for multiple, preferably all, fingernails of the individual.

13. The method according to claim 1, wherein the steps (a) and (b) are repeated individually for multiple, preferably all, fingernails of the individual and steps (c) and (d) are performed individually for each fingernail or are performed for more than one fingernail at a time.

14. A method for fitting one or more artificial nails to an individual, the method comprising:

i) accessing information which has been obtained and stored for the individual and which includes at least information defining the boundary line of a trimmed artificial nail which fits the individual's natural nail plate, and which information is sufficient to allow reproduction of the trimmed artificial nail from an untrimmed artificial nail, wherein the information which has been obtained and stored for the individual has been obtained and stored according to a method comprising the steps of:

a) providing a first untrimmed artificial nail of length L, width W, and depth of curvature D, wherein the first untrimmed artificial nail has a tip, T, a bottom, B, and a left lateral side LF and a right lateral side R, respectively, wherein a thickness at the tip T of the first untrimmed artificial nail is greater than a thickness of the left lateral side LF and the right lateral side R, wherein the thickness of the left lateral side LF and the right lateral side R is same, b) trimming the first untrimmed artificial nail to fit the individual's natural nail plate, wherein the trimmed artificial nail is fitted to the individual's natural nail plate directly, c) recording the information characterising the shape of the trimmed artificial nail, which includes:

at least the information defining a boundary line of the trimmed artificial nail, and which information is sufficient to allow reproduction of the trimmed artificial nail from an untrimmed artificial nail, C1) placing the trimmed artificial nail on a second untrimmed artificial nail of the same length, width and depth of curvature as the first untrimmed artificial nail, C2) marking the boundary line of the trimmed artificial nail on to the second untrimmed artificial nail, and C3) taking an image of the marked second untrimmed artificial nail, d) storing the information as well as identifying details of the individual, ii) using the information to select and trim one or more untrimmed artificial nails prior to the individual attending a nail fitting appointment, iii) optionally decorating the one or more trimmed artificial nails prior to the nail fitting appointment, and iv) fitting the trimmed artificial nail or nails at the nail fitting appointment.

* * * * *